United States Patent
Kotra et al.

(10) Patent No.: US 12,483,696 B2
(45) Date of Patent: Nov. 25, 2025

(54) ENCODER, DECODER AND CORRESPONDING METHODS ABOUT SIGNALING HIGH LEVEL SYNTAX

(71) Applicant: Huawei Technologies Co., Ltd., Guangdong (CN)

(72) Inventors: Anand Meher Kotra, Munich (DE); Semih Esenlik, Munich (DE); Biao Wang, Shenzhen (CN); Han Gao, Shenzhen (CN); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 17/879,337

(22) Filed: Aug. 2, 2022

(65) Prior Publication Data
US 2022/0394247 A1    Dec. 8, 2022

Related U.S. Application Data

(63) Continuation of application No. PCT/CN2021/071969, filed on Jan. 15, 2021.

(30) Foreign Application Priority Data

Feb. 4, 2020  (WO) .................. PCT/EP2020/052682
Mar. 31, 2020  (WO) .................. PCT/EP2020/059031

(51) Int. Cl.
*H04N 19/117*  (2014.01)
*H04N 19/174*  (2014.01)
(Continued)

(52) U.S. Cl.
CPC ......... *H04N 19/117* (2014.11); *H04N 19/174* (2014.11); *H04N 19/176* (2014.11); *H04N 19/186* (2014.11); *H04N 19/70* (2014.11)

(58) Field of Classification Search
CPC .... H04N 19/70; H04N 19/186; H04N 19/174; H04N 19/117; H04N 19/172;
(Continued)

(56) References Cited

U.S. PATENT DOCUMENTS 10,136,146 B1    11/2018   Wu et al.
11,477,449 B2*   10/2022   Zhang ................... H04N 19/70
(Continued)

FOREIGN PATENT DOCUMENTS

CN    101517909 A    8/2009
CN    102550026 A    7/2012
(Continued)

OTHER PUBLICATIONS

Xu et al. "AHG9: On deblocking control parameters" Joint Video Experts Team (JVET) of ITU-T SG 16 WP 3 and ISO/IEC JTC 1/SC 29/WG 11 17th Meeting: Brussels, BE, Jan. 7-17, 2020, Document: JVET-Q0121-v1, 7 Pages. (Year: 2020).*
(Continued)

*Primary Examiner* — Nathnael Aynalem
(74) *Attorney, Agent, or Firm* — WOMBLE BOND DICKINSON (US) LLP

(57) ABSTRACT

A method of coding is disclosed. The method comprises obtaining a bitstream for a coding block; obtaining a value of a syntax from the bitstream; obtaining a value of deblocking control parameter for chroma component of a slice of a coded picture from the bitstream, when the value of the syntax is equal to a preset value. The method comprises performing a deblocking process on a block in the slice according to the value of the deblocking control parameter.

17 Claims, 10 Drawing Sheets

(51) Int. Cl.
*H04N 19/176* (2014.01)
*H04N 19/186* (2014.01)
*H04N 19/70* (2014.01)

(58) Field of Classification Search
CPC ...... H04N 19/86; H04N 19/82; H04N 19/105; H04N 19/176; H04N 19/52; H04N 19/184; H04N 19/17; H04N 19/50; H04N 19/80; H04N 19/107; H04N 19/11; H04N 19/44
USPC .............................................. 375/240–240.29
See application file for complete search history.

(56) References Cited

U.S. PATENT DOCUMENTS

| | | | |
|---|---|---|---|
| 2013/0182755 | A1 | 7/2013 | Chen et al. |
| 2014/0003497 | A1 | 1/2014 | Sullivan et al. |
| 2014/0003498 | A1 | 1/2014 | Sullivan |
| 2014/0044168 | A1 | 2/2014 | Seregin et al. |
| 2014/0079135 | A1 | 3/2014 | Van Der Auwera et al. |
| 2015/0016550 | A1* | 1/2015 | Kim ........................ H04N 19/86 375/240.29 |
| 2015/0085929 | A1 | 3/2015 | Chen et al. |
| 2015/0249842 | A1 | 9/2015 | Norkin |
| 2015/0264374 | A1* | 9/2015 | Xiu ........................ H04N 19/46 375/240.25 |
| 2016/0286219 | A1 | 9/2016 | Rusanovskyy |
| 2016/0360234 | A1 | 12/2016 | Tourapis et al. |
| 2017/0078704 | A1 | 3/2017 | Charmet |
| 2017/0295369 | A1* | 10/2017 | Nakagami ............... H04N 19/86 |
| 2018/0041757 | A1 | 2/2018 | Liu et al. |
| 2018/0270480 | A1 | 9/2018 | Zhang et al. |
| 2019/0306503 | A1 | 10/2019 | Dong et al. |
| 2020/0029071 | A1 | 1/2020 | Kang et al. |
| 2021/0058620 | A1* | 2/2021 | Ramasubramanian ...................... H04N 19/124 |
| 2022/0286685 | A1* | 9/2022 | Hendry ................ H04N 19/157 |
| 2022/0394247 | A1 | 12/2022 | Kotra et al. |

FOREIGN PATENT DOCUMENTS

| | | |
|---|---|---|
| CN | 103119937 A | 5/2013 |
| CN | 103999469 A | 8/2014 |
| CN | 105532007 A | 4/2016 |
| CN | 106105227 A | 11/2016 |
| CN | 107509078 A | 12/2017 |
| CN | 107548556 A | 1/2018 |
| CN | 116233470 B | 1/2024 |
| JP | 2013229865 A | 11/2013 |
| JP | 2016046641 A | 4/2016 |
| RU | 2636103 C2 | 11/2017 |
| TW | 201947933 A | 12/2019 |
| WO | 2013159335 A1 | 10/2013 |
| WO | 2014107709 A2 | 7/2014 |
| WO | 2016056398 A1 | 4/2016 |
| WO | 2018122092 A1 | 7/2018 |
| WO | 2021138550 A1 | 7/2021 |
| WO | 2021155740 A1 | 8/2021 |

OTHER PUBLICATIONS

W-S Kim et al: "AhGS: Deblocking Filter in 4:4:4 Chroma Format" 15. JCT-VC Meeting; URL: http://wftp3.itu.int/av-arch/jctvc-site/, No. JCTVC-O0089, Oct. 15, 2013, XP030115076, 6 pages.

Flynn D et al: "Range Extensions Draft 4", 14. JCT-VC Meeting; URL: http://wftp3.itu.int/av-arch/jctvc-site/, No. JCTVC-N1005, Aug. 7, 2013, XP030114949, 320 pages.

Xu (Bytedance) J et al: "AHG9: On deblocking control parameters", 17. JVET Meeting; No. JVET-Q0121; m51710, Dec. 31, 2019, XP030222612, 7 pages.

Kotra (Huawei) A M et al: "AHG9: Modified signalling of Chroma deblocking control parameters", 130. MPEG Meeting; No. m53183; JVET-R0206, Apr. 3, 2020, XP030286165, 9 pages.

Naser (Interdigital) K et al: "AhG 9: Removed Redundant Coding of Chroma Deblocking Filter Parameters", 130. MPEG Meeting; No. m53147; JVET-R0172, Apr. 6, 2020, XP030286111, 9 pages.

Deshpande (Sharplabs) S et al: "AHG9: On Deblocking Control", 130. MPEG Meeting; No. m53073; JVET-R0106, Apr. 3, 2020 , XP030285912, 7 pages.

David Flynn et al.,"High Efficiency Video Coding (HEVC) Range Extensions text specification: Draft 4", Joint Collaborative Team on Video Coding (JCT-VC) of ITU-T SG 16 WP 3 and ISO/IEC JTC 1/SC 29/WC} 11,13th Meeting: Incheon, KR, Apr. 18-26, 2013, JCTVC-N100_5 v1,total:320pages.

Benjamin Bross et al.,"Versatile Video Coding (Draft 6)",Joint Video Experts Team (JVET) of ITU-T SG 16 WP 3 and ISO/IEC JTC 1/SC 29/VVG 11,15th Meeting: Gothenburg, SE, Jul. 3-12, 2019,Document: . JVET-O2001-vE, total:455pages.

L. Xu et al.,"CE8-related: A SPS Level Flab For BDPCM and JCCR",Joint Video Experts Team (JVET) of ITU-T SG 16 WP 3 and ISO/IEC JTC 1/SC 29/WG11,15th Meeting: Gothenburg, SE, Jul. 3-12, 2019, JVET-00376-v3,total:4pages.

Jizheng Xu et al.,"Non-CES: Chroma QP derivation fix for deblocking filter (Combination of JVET-P0105 and JVET-P0539)",Joint Video Experts Team (JVET) of ITU-T SG 16 WP 3 and ISO/IEC JTC 1/SC 29/WG 11, 16th Meeting: Geneva, CH, 1 Oct. 11, 2019,Document: .JVET-P1002,total:7pages.

Benjamin Bross et al, Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, total Document: JVET-Q2001-vE, total 513 pages.

Ling Li et al., "AHG12: Signaling of chroma presence in PPS and APS," Document: JVET-Q0420-v1, Joint Video Experts Team (JVET) of ITU-T SG 16 WP 3 and ISO/IEC JTC 1/SC 29/WG 11, 17th Meeting: Brussels, BE, Jan. 7-17, 2020, 3 pages.

Document: JVET-P2001-vE, Benjamin Bross et al., Versatile Video Coding (Draft 7), Joint Video Experts Team (JVET) of ITU-T SG 16 WP 3 and ISO/IEC JTC 1/SC 29/WG 11, 16th Meeting: Geneva, CH, Oct. 1-11, 2019, total 492 pages.

* cited by examiner

ENCODER, DECODER AND CORRESPONDING METHODS ABOUT SIGNALING HIGH LEVEL SYNTAX

CROSS-REFERENCE TO RELATED APPLICATIONS

This application is a continuation of International Application No. PCT/CN2021/071969, filed on Jan. 15, 2021, which claims priority to International Patent Application No. PCT/EP2020/052682, filed on Feb. 4, 2020 and International Patent Application No. PCT/EP2020/059031, filed on Mar. 31, 2020, the disclosures of which are hereby incorporated by reference in their entirety.

TECHNICAL FIELD

Embodiments of the present application generally relate to the field of picture processing and more particularly to syntax signaling.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

The first aspect of the present disclosure provides a method of coding implemented by a decoding device, the method comprising: obtaining a value of a syntax element from a bitstream, wherein the value of the syntax element is related to a deblocking control parameter for a chroma component of a slice of a coded picture; parsing a value of the deblocking control parameter for chroma component of the slice from the bitstream, when the value of the syntax element is equal to a preset value, the preset value is an integer value. In an example, the preset value is not equal to 0. In an example, the preset value is 1.

In an embodiment, the method further comprises: performing deblocking process on a block in the slice according to the value of the deblocking control parameter.

According to embodiments of the present disclosure, a signaling scheme of deblocking control parameter is disclosed, the deblocking control parameter for chroma component is conditionally signaled. When the chroma format is (4:0:0 or (4:4:4 and the separate colour plane coding mode is in use)), the deblocking control parameter for chroma component is not signaled in bitstream. Hence, the bitstream utilization and decoding efficiency have been improved.

In an embodiment, the value of the syntax element is obtained from a picture parameter set, PPS.

In an embodiment, the value of the deblocking control parameter is obtained from the PPS.

In an embodiment, the value of the deblocking control parameter is obtained from a picture header, PH.

In an embodiment, the value of the deblocking control parameter is obtained from a slice header, SH.

In an embodiment, when there is no color component in a video sequence, the value of the syntax element is equal to 0.

In an embodiment, the deblocking control parameter is signaled (only) when the video sequence has a color component.

In an embodiment, the value of the syntax element is used to determine whether a deblocking control parameter for luma component of the slice is same as the deblocking control parameter for chroma component of the slice.

In an embodiment, the method further comprises:
  setting the value of the deblocking control parameter for chroma component of the slice equal to a value of a deblocking control parameter for luma component of the slice, when the value of the syntax element is not equal to the preset value.

In an embodiment, the value of the deblocking control parameter is a preset deblocking parameter offsets that is applied to a Joint Cb-Cr component of the slice.

The second aspect of the present disclosure provides a video decoding apparatus, the apparatus comprise: a parsing module, which is configured to obtain a value of a syntax element from a bitstream, wherein the value of the syntax element is related to a deblocking control parameter for a chroma component of a slice of a coded picture; the parsing module is configured to obtain a value of a deblocking control parameter for chroma component of the slice from the bitstream, when the value of the syntax element is equal to a preset value, the preset value is an integer value.

In an embodiment, the decoding apparatus further comprises a receiving module, which is configured to obtain the bitstream.

In an embodiment, the decoding apparatus further comprises a deblocking module, which is configured to perform deblocking process on a block in the slice according to the value of the deblocking control parameter.

According to embodiments of the present disclosure, a signaling scheme of deblocking control parameter is disclosed, the deblocking control parameter for chroma component is conditionally signaled. When the chroma format is (4:0:0 or (4:4:4 and the separate colour plane coding mode is in use)), the deblocking control parameter for chroma component is not signaled in bitstream. Hence, the bitstream utilization and decoding efficiency have been improved.

In an embodiment, the value of the syntax element is obtained from a picture parameter set, PPS.

In an embodiment, the value of the deblocking control parameter is obtained from the PPS.

In an embodiment, the value of the deblocking control parameter is obtained from a picture header, PH.

In an embodiment, the value of the deblocking control parameter is obtained from a slice header, SH.

In an embodiment, when there is no color component in a video sequence, the value of the syntax element is equal to 0.

In an embodiment, the deblocking control parameter is signaled (only) when the video sequence has a color component.

In an embodiment, the value of the syntax element is used to determine whether a deblocking control parameter for luma component of the slice is same as the deblocking control parameter for chroma component of the slice.

In an embodiment, the parsing module is further configured to:
set the value of the deblocking control parameter for chroma component of the slice equal to a value of a deblocking control parameter for luma component of the slice, when the value of the syntax element is not equal to the preset value.

In an embodiment, the value of the deblocking control parameter is a preset deblocking parameter offsets that is applied to a Joint Cb-Cr component of the slice.

The third aspect of the present disclosure provides a method of coding implemented by an encoding device, the method comprising:
determining a value of a syntax element for a slice of a coded picture, wherein the value of the syntax element is related to a deblocking control parameter for a chroma component of the slice; encoding a value of a deblocking control parameter for chroma component of the coding block into a bitstream, when it's determined that the value of the syntax element is equal to a preset value, the preset value is an integer value. In an example, the preset value is not equal to 0. In an example, the preset value is 1.

According to embodiments of the present disclosure, a signaling scheme of deblocking control parameter is disclosed, the deblocking control parameter for chroma component is conditionally signaled. When the chroma format is (4:0:0 or (4:4:4 and the separate colour plane coding mode is in use)), the deblocking control parameter for chroma component is not signaled in bitstream. Hence, the bitstream utilization and decoding efficiency have been improved.

In an embodiment, the value of the syntax element is signaled in the PPS.

In an embodiment, the value of the deblocking control parameter is signaled in the PPS.

In an embodiment, the value of the deblocking control parameter is signaled in a picture header, PH.

In an embodiment, the value of the deblocking control parameter is signaled in a slice header, SH.

In an embodiment, when there is no color component in a video sequence, the value of the syntax element is determined to equal to 0.

In an embodiment, the deblocking control parameter is signaled (only) when the video sequence has a color component.

In an embodiment, the value of the syntax element is used to determine whether a deblocking control parameter for luma component of the slice is same as the deblocking control parameter for chroma component of the slice.

In an embodiment, the value of the deblocking control parameter is a preset deblocking parameter offsets that is applied to a Joint Cb-Cr component of the slice.

The fourth aspect of the present disclosure provides an video encoding apparatus, the video encoding apparatus comprises: a determining module, which is configured to determine a value of a syntax element for a slice of a coded picture, wherein the value of the syntax element is related to a deblocking control parameter for a chroma component of the slice; a processing module, which is configured to encode a value of a deblocking control parameter for the chroma component of the slice into a bitstream, when it's determined that the value of the syntax element is equal to a preset value, the preset value is an integer value. In an example, the preset value is not equal to 0. In an example, the preset value is 1.

According to embodiments of the present disclosure, a signaling scheme of deblocking control parameter is disclosed, the deblocking control parameter for chroma component is conditionally signaled. When the chroma format is (4:0:0 or (4:4:4 and the separate colour plane coding mode is in use)), the deblocking control parameter for chroma component is not signaled in bitstream. Hence, the bitstream utilization and decoding efficiency have been improved.

In an embodiment, the value of the syntax element is signaled in the PPS.

In an embodiment, the value of the deblocking control parameter is signaled in the PPS.

In an embodiment, the value of the deblocking control parameter is signaled in a picture header, PH.

In an embodiment, the value of the deblocking control parameter is signaled in a slice header, SH.

In an embodiment, when there is no color component in a video sequence, the value of the syntax element is determined to equal to 0.

In an embodiment, the deblocking control parameter is signaled (only) when the video sequence has a color component.

In an embodiment, the value of the syntax element is used to determine whether a deblocking control parameter for luma component of the slice is same as the deblocking control parameter for chroma component of the slice.

In an embodiment, the value of the deblocking control parameter is a preset deblocking parameter offsets that is applied to a Joint Cb-Cr component of the slice.

The fifth aspect of the present disclosure provides a decoder comprising processing circuitry for carrying out the method according to the first aspect and any one of the embodiments of the first aspect.

The sixth aspect of the present disclosure provides a computer program product comprising program code for performing the method according to the first aspect, the third aspect and any one of the embodiments of the first aspect, the third aspect when executed on a computer or a processor.

The seventh aspect of the present disclosure provides a decoder, comprising: one or more processors; and a non-transitory computer-readable storage medium coupled to the processors and storing programming for execution by the processors, wherein the programming, when executed by the processors, configures the decoder to carry out the method according to any one of the first aspect, the third aspect and any one of the embodiments of the first aspect, the third aspect.

The eighth aspect of the present disclosure provides a non-transitory computer-readable medium carrying a program code which, when executed by a computer device, causes the computer device to perform the method according to any one of the first aspect, the third aspect and any one of the embodiments of the first aspect, the third aspect.

The ninth aspect of the present disclosure provides an encoder comprising processing circuitry for carrying out the method according to the third aspect and any one of the embodiments of the third aspect.

The tenth aspect of the present disclosure provides an encoder, comprising: one or more processors; and a non-transitory computer-readable storage medium coupled to the processors and storing programming for execution by the processors, wherein the programming, when executed by the processors, configures the decoder to carry out the method according to any one of the third aspect and any one of the embodiments of the third aspect.

The eleventh aspect of the present disclosure provides a non-transitory storage medium comprising a bitstream encoded/decoded by the method of any one of the above embodiments.

The twelfth aspect of the present disclosure provides an encoded bitstream for the video signal by including a plurality of syntax elements, wherein the plurality of syntax elements comprises a deblocking control parameter for chroma component, which is conditionally signaled at least based on a value of a syntax element, wherein the value of the syntax element is related to a deblocking control parameter for a chroma component of a slice of a coded picture.

The thirteen aspect of the present disclosure provides a non-transitory storage medium which includes an encoded bitstream decoded by an image decoding device, the bit stream being generated by dividing a frame of a video signal or an image signal into a plurality blocks, and including a plurality of syntax elements, wherein the plurality of syntax elements comprises a deblocking control parameter for chroma component, which is conditionally signaled at least based on a value of a syntax element, wherein the value of the syntax element is related to a deblocking control parameter for a chroma component of a slice of a coded picture.

The method according to the first aspect of the disclosure can be performed by the apparatus according to the second aspect of the disclosure. Further features and embodiments of the method according to the first aspect of the disclosure correspond to the features and embodiments of the apparatus according to the second aspect of the disclosure.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
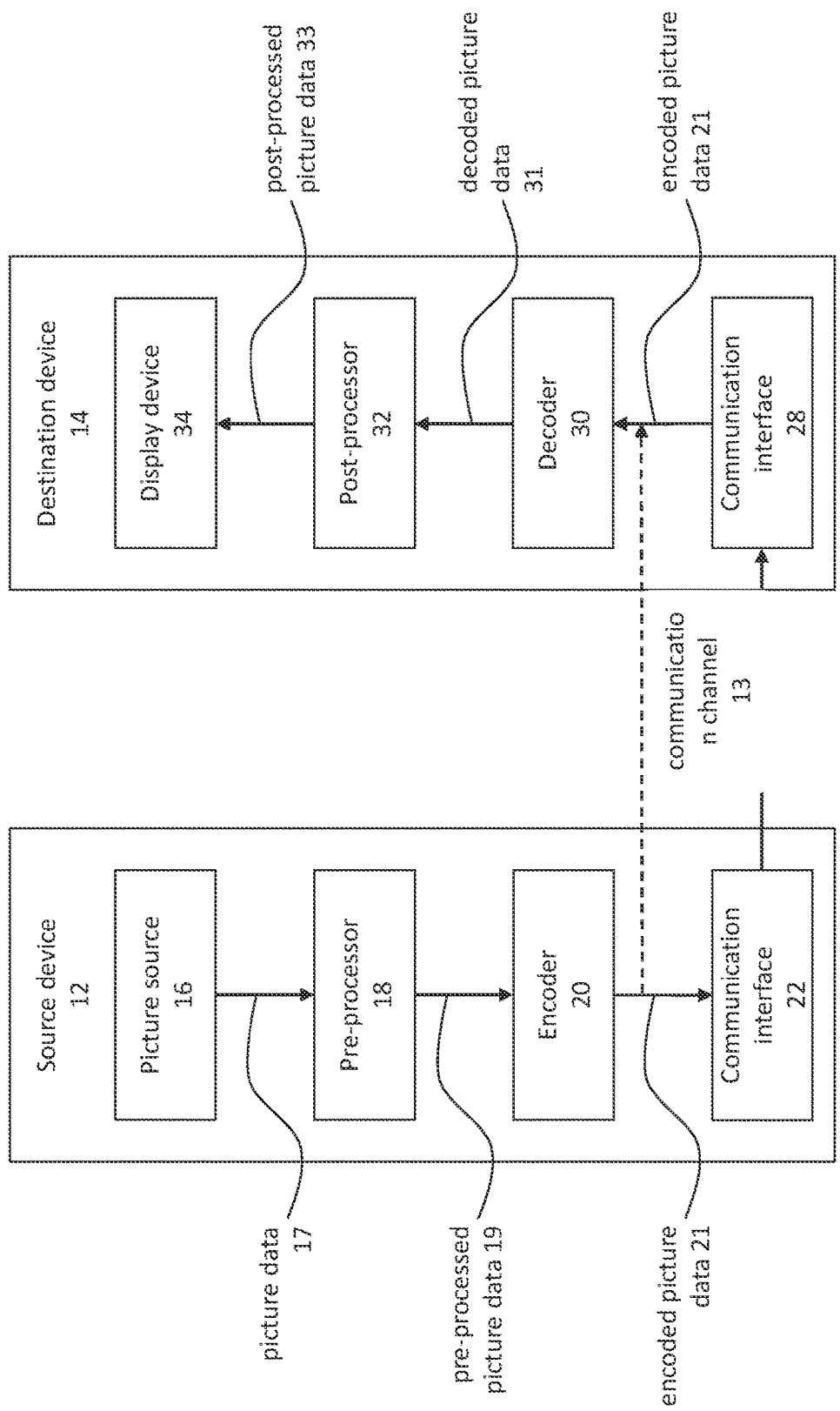
FIG. 1A is a block diagram showing an example of a video coding system according to an embodiment.

In the following identical reference signs refer to identical or at least functionally equivalent features if not explicitly specified otherwise.

DETAILED DESCRIPTION

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if an apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or coding system 10) that may utilize the embodiments described herein. Video encoder 20 (or encoder 20) and video decoder 30 (or decoder 30) of video coding system 10 represent examples of devices that may be configured to perform techniques in accordance with various examples described in the present application.

As shown in FIG. 1A, the coding system 10 comprises a source device 12 configured to provide encoded picture data 21, e.g. to a destination device 14 for decoding the encoded picture data 13.

The source device 12 comprises an encoder 20, and may additionally comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
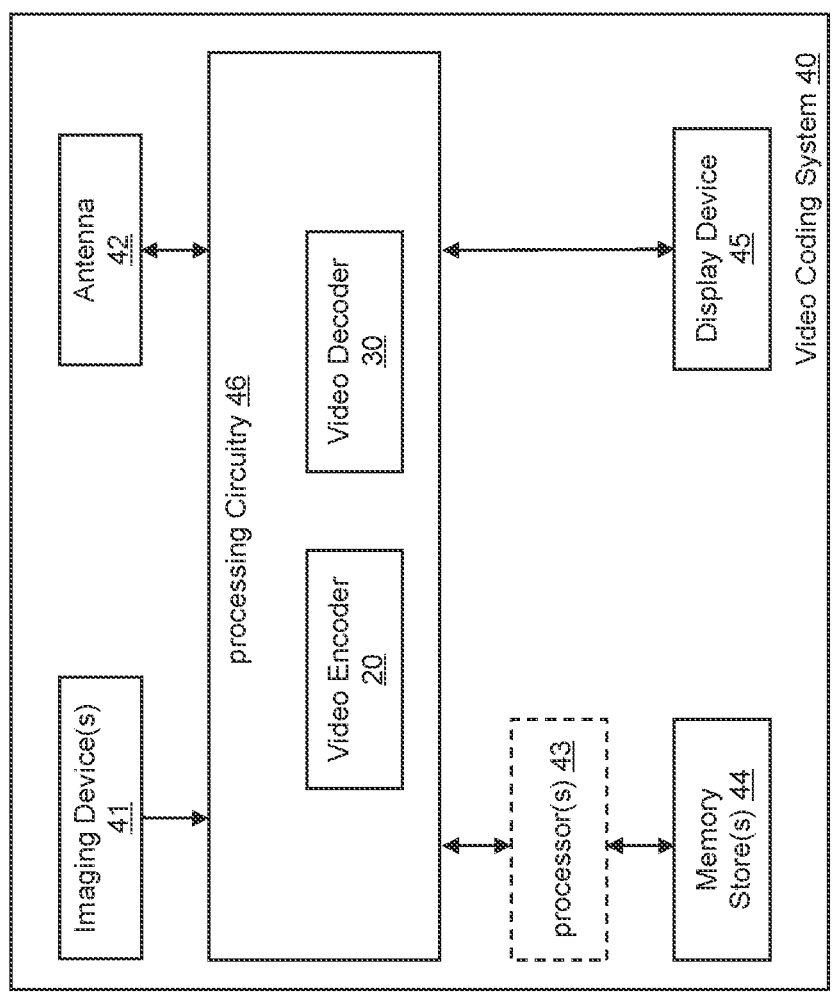
FIG. 1B is a block diagram showing another example of a video coding system according to an embodiment.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
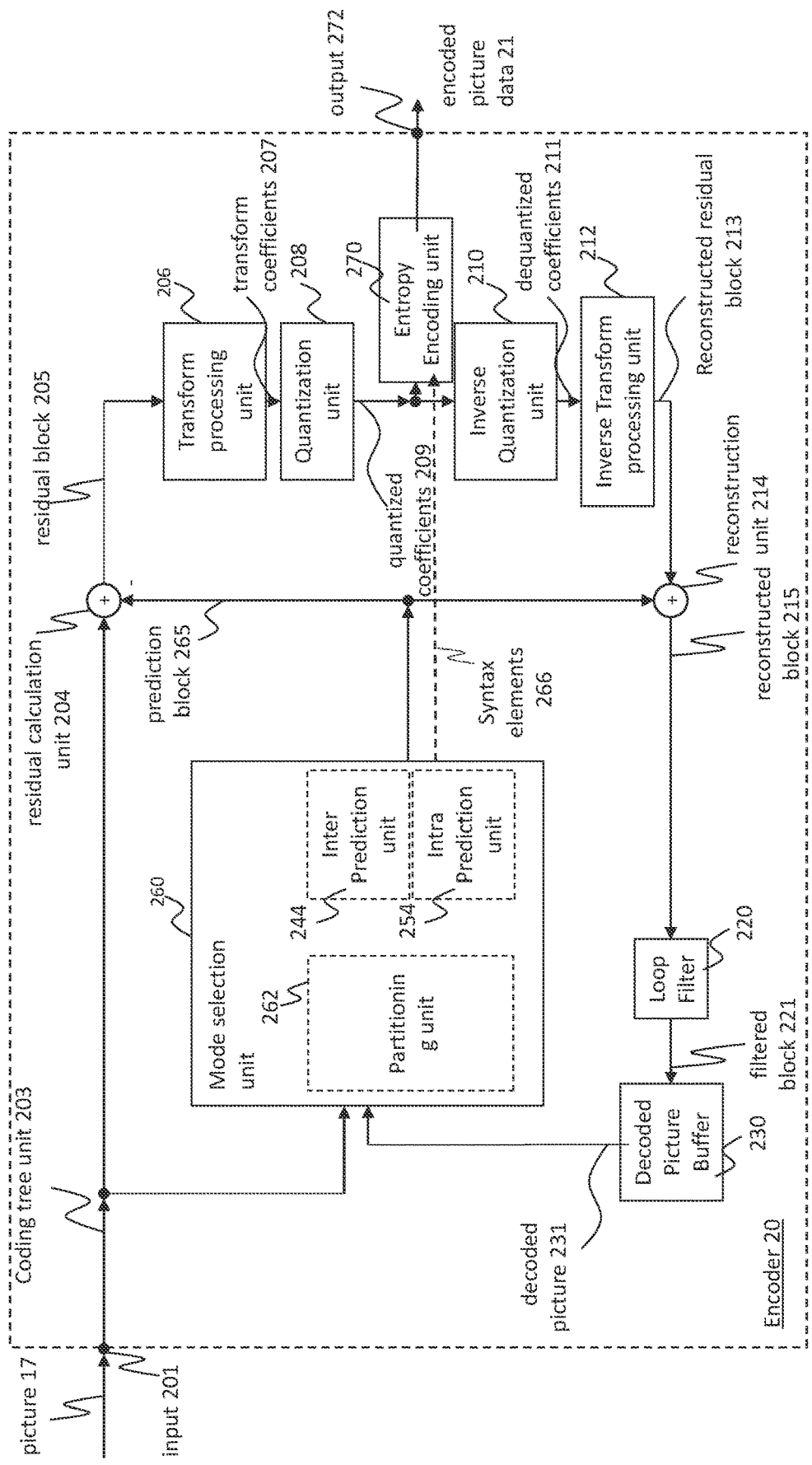
FIG. 2 is a block diagram showing an example of a video encoder according to an embodiment.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
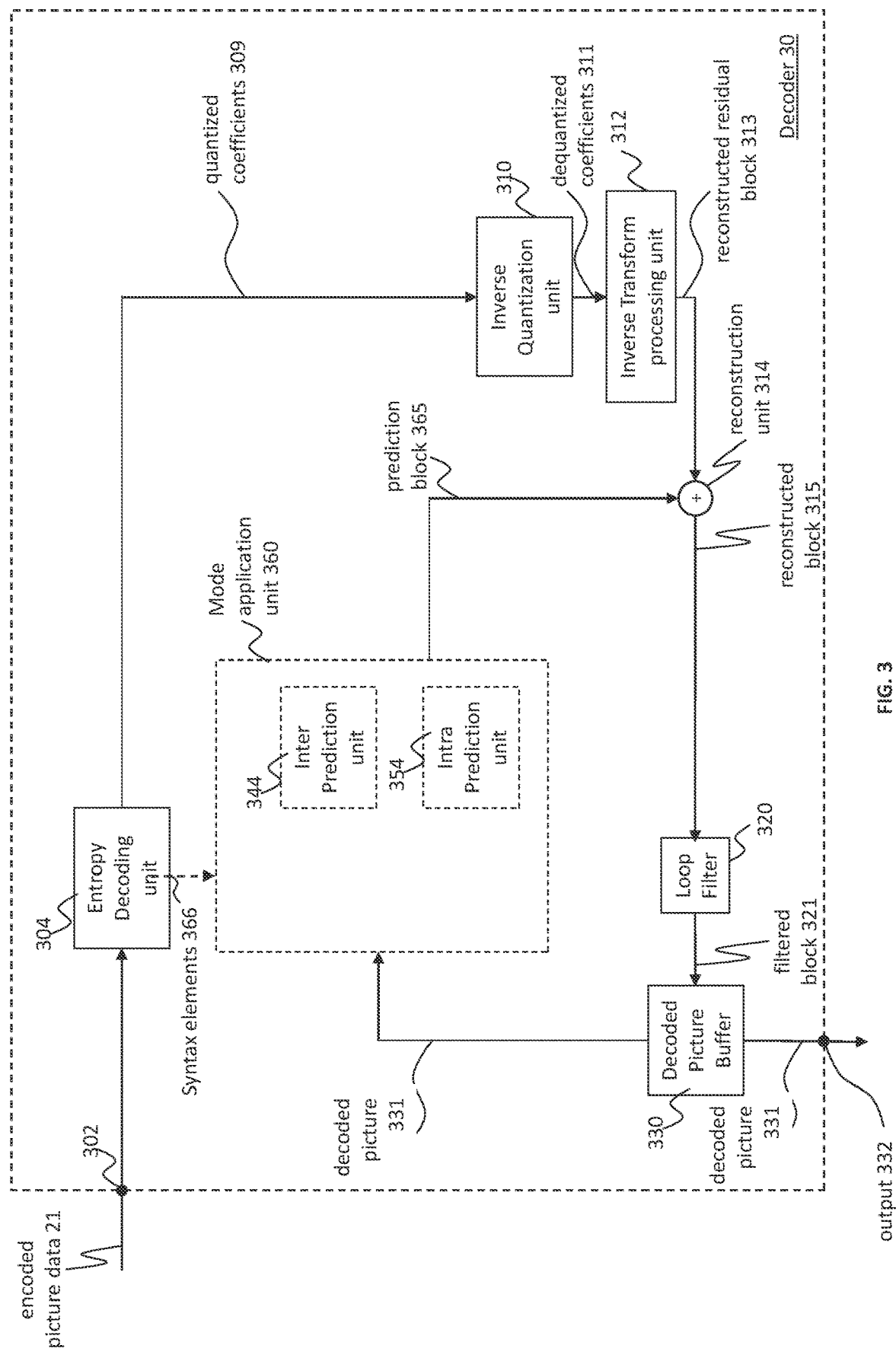
FIG. 3 is a block diagram showing an example structure of a video decoder according to an embodiment.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges.

To effectively remove blocking artifacts occurring for large "blocks", VVC uses a longer tap deblocking filter. Here the term "blocks" is used in a very generic fashion and it may refer to a "transform block (TB), prediction block (PB) or a coding unit block (CU)". The longer tap filter is applied to both Luma and Chroma components. The longer tap filter for the Luma components modifies a maximum of 7 samples for each line of samples perpendicular and adjacent to the edge and it is applied for blocks whose size is >=32 samples in the direction of deblocking i.e. for vertical edges, the block width should be >=32 samples and for horizontal edges, the block height should be >=32 samples.

The Chroma longer tap filter is applied for Chroma blocks when both blocks adjacent to a given edge have a size >=8 samples and it modifies a maximum of three samples on either side of the edge. Therefore for vertical edges the block width of both the blocks adjacent to the edge should be >=8 sample sand for the horizontal edges the block height of both the blocks adjacent to the edge should be >=8 samples. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

Figure 6:
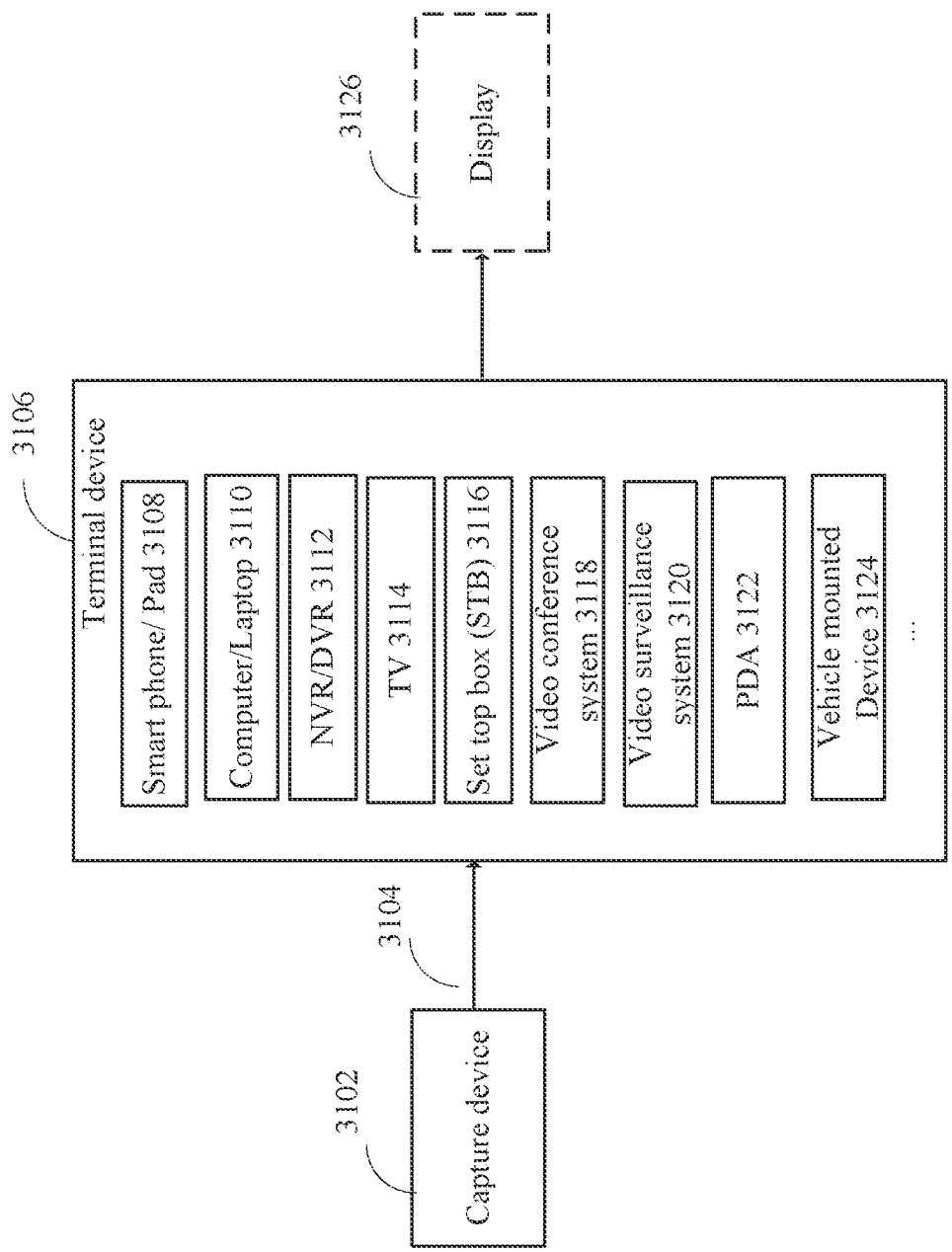
FIG. 6 is a block diagram showing an example structure of a content supply system 3100 which realizes a content delivery service.

In embodiments, e.g., according to the latest video coding standard currently in development, which is referred to as Versatile Video Coding (VVC), a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.VVC develops a unique signaling mechanism of the partition splitting information in quadtree with nested multi-type tree coding tree structure. In the signalling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs sizes.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using preset construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
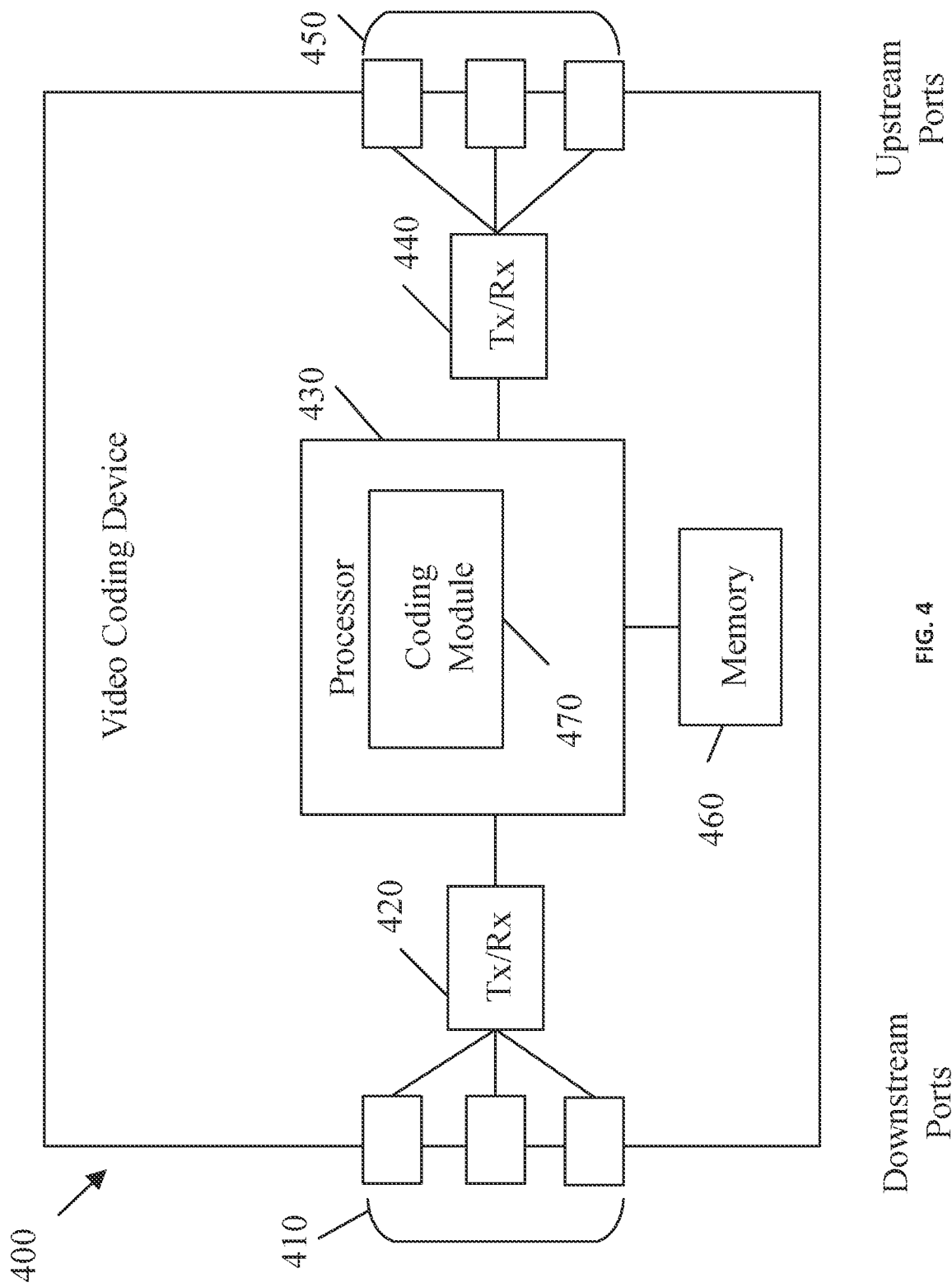
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
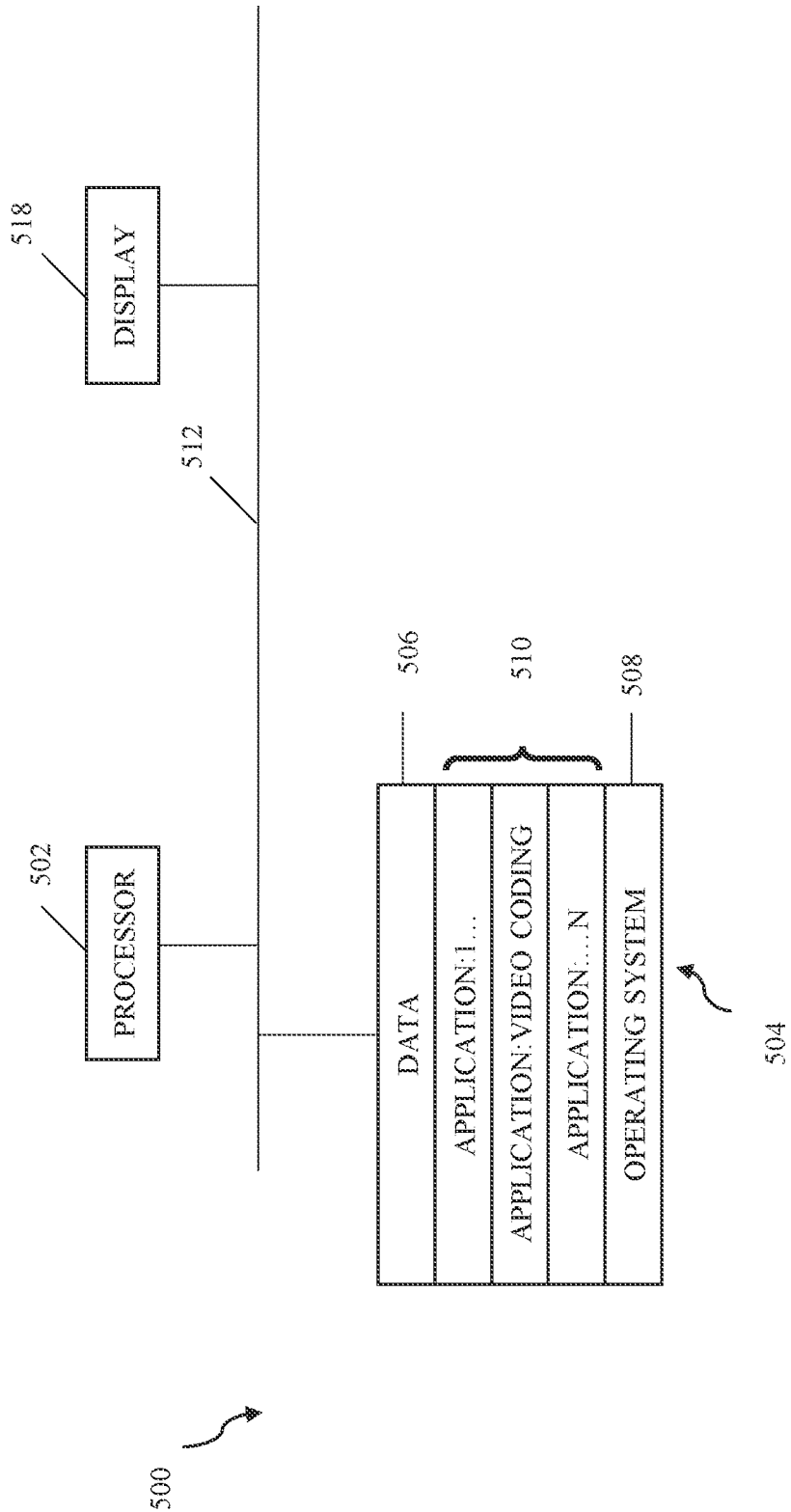
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

For deblocking filter process disclosed in HEVC, two high level control parameters beta_offset_div2 and tc_offset_div2 have been introduced to control the strength of the deblocking. These parameters can be transmitted at the picture parameter set (PPS) level or can be overwritten at the slice header level.

In an example, separate deblocking filter control parameters for Cb and Cr components were introduced to offer better deblocking flexibility. These deblocking control parameters can be signalled in the PPS or Picture header (PH) or Slice header (SH).

The syntax for the deblocking control parameters is as follows:

PPS Syntax:

```
...
pps_chroma_tool_offsets_present_flag                              u(1)
if( pps_chroma_tool_offsets_present_flag) {
    pps_cb_qp_offset                                              se(v)
    pps_cr_qp_offset                                              se(v)
    pps_joint_cbcr_qp_offset_present_flag                         u(1)
    if( pps_joint_cbcr_qp_offset_present_flag )
        pps_joint_cbcr_qp_offset_value                            se(v)
    pps_slice_chroma_qp_offsets_present_flag                      u(1)
    pps_cu_chroma_qp_offset_list_enabled_flag                     u(1)
}
if( pps_cu_chroma_qp_offset_list_enabled_flag) {
    chroma_qp_offset_list_len_minus1                              ue(v)
    for( i = 0; i <= chroma_qp_offset_list_len_minus1; i++) {
        cb_qp_offset_list[ i ]                                    se(v)
        cr_qp_offset_list[ i ]                                    se(v)
        if( pps_joint_cbcr_qp_offset_present_flag)
            joint_cbcr_qp_offset_list[ i ]                        se(v)
    }
}
pps_weighted_pred_flag                                            u(1)
pps_weighted_bipred_flag                                          u(1)
deblocking_filter_control_present_flag                            u(1)
if( deblocking_filter_control_present_flag) {
    deblockin_filter_override_enabled_flag                        u(1)
    pps_deblocking_filter_disabled_flag                           u(1)
    if( !pps_deblocking_filter_disabled_flag) {
        pps_beta_offset_div2                                      se(v)
```

-continued

```
        pps_tc_offset_div2                                        se(v)
        pps_cb_beta_offset_div2                                   se(v)
        pps_cb_tc_offset_div2                                     se(v)
        pps_cr_beta_offset_div2                                   se(v)
        pps_cr_tc_offset_div 2                                    se(v)
    }
}
...
if( deblocking_filter_override_enabled_flag)
    dbf_info_in_ph_flag                                           u(1)
...
```

PH Syntax:

```
...
    if( deblocking_filter_override_enabled_flag &&
        dbf_info_in_ph_flag) {
        ph_deblocking_filter_override_flag                        u(1)
        if( ph_deblocking_filter_override_flag) {
            ph_deblocking_filter_disabled_flag                    u(1)
            if( !ph_deblocking_filter_disabled_flag) {
                ph_beta_offset_div2                               se(v)
                ph_tc_offset_div2                                 se(v)
                ph_cb_beta_offset_div2                            se(v)
                ph_cb_tc_offset_div2                              se(v)
                ph_cr_beta_offset_div2                            se(v)
                ph_cr_tc_offset_div2                              se(v)
            }
        }
    }
...
```

Slice Header Syntax:

```
...
    if(deblocking_filter_override_enabled_flag &&
        !dbf_info_in_ph_flag)
        slice_deblocking_filter_override_flag                     u(1)
        if( slice_deblocking_filter_override_flag) {
            slice_deblocking_filter_disabled_flag                 u(1)
            if(!slice_deblocking_filter_disabled_flag ) {
                slice_beta_offset_div2                            se(v)
                slice_tc_offset_div2                              se(v)
                slice_cb_beta_offset_div2                         se(v)
                slice_cb_tc_offset_div2                           se(v)
                slice_cr_beta_offset_div2                         se(v)
                slice_cr_tc_offset_div2                           se(v)
            }
        }
...
```

The semantics of the deblocking control syntax elements are as follows:

pps_chroma_tool_offsets_present_flag equal to 1 specifies that chroma tool offsets related syntax elements are present in the PPS RBSP syntax structure.

pps_chroma_tool_offsets_present_flag equal to 0 specifies that chroma tool offsets related syntax elements are not present in in the PPS RBSP syntax structure. When ChromaArrayType is equal to 0, the value of pps_chroma_tool_offsets_present_flag shall be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0. pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

slice_beta_offset_div2 and slice_tc_offset_div2 specify the deblocking parameter offsets for β and tC (divided by 2) that are applied to the luma component for the current slice. The values of slice_beta_offset_div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

Versatile Video Coding (VVC) uses a tool called as Joint Chroma residual coding (JCCR), which is signaled in the bitstream using a syntaxl "tu_joint_cbcr_residual_flag". This tool specifies whether the residual samples for both Chroma components Cb and Cr are coded as a single transform block. A value of "tu_joint_cbcr_residual_flag" equal to 1 specifies that the transform unit syntax includes the transform coefficient levels for a single transform block from which the residual samples for both Cb and Cr are derived. JCCR tool takes advantage of the fact that both Cb and Cr residuals appear to mostly correlate inversely with each other.

Depending on tu_joint_cbcr_residual_flag, tu_cbf_cb, and tu_cbf_cr, the variable TuCResMode is derived as follows, where, tu_cbf_cb specifies the coded block flag of the Cb component, tu_cbf_cr is the coded block flag of the Cr component. And TuCResMode indicates the JCCR mode.

If tu_joint_cbcr_residual_flag is equal to 0, the variable TuCResMode is set equal to 0;

Otherwise, if tu_cbf_cb is equal to 1 and tu_cbf_cr is equal to 0, the variable TuCResMode is set equal to 1;

Otherwise, if tu_cbf_cb is equal to 1, the variable TuCResMode is set equal to 2;

Otherwise, the variable TuCResMode is set equal to 3.

The relation between the "reconstruction of Cb and Cr residuals" based on the variables tu_cbf_cb, and tu_cbf_cr, the variable TuCResMode is as shown in the table below.

| tu_cb_fcb | tu_cb_fcr | TuCResMode | Reconstruction of Cb and Cr residuals |
|---|---|---|---|
| 1 | 0 | 1 | resCb[ x ][ y ] = resJointC[ x ][ y ]<br>resCr[ x ][ y ] = ( CSign * resJointC[ x ][ y ]) >> 1 |
| 1 | 1 | 2 | resCb[ x ][ y ] = resJointC[ x ][ y ]<br>resCr[ x ][ y ] = CSign * resJointC[ x ][ y ] |
| 0 | 1 | 3 | resCb[ x ][ y ] = (CSign * resJointC[ x ][ y ]) >> 1<br>resCr x ][ y ] = resJointC[ x ][ y ] |

The variable CSgin is sign value (+1 or −1) and this is signaled in the slice header.

resJointC[x][y] is the actual transmitted residual in the bitstream.

resCb[x][y] indicates the derived residual samples for the Chroma component Cb;

resCr[x][y] indicates the derived residual samples for the Chroma component Cr.

Additionally, VVC 6.0 may use separate Chroma QP mapping tables for each of the Chroma components Cb and Cr, and a separate mapping table for joint Cb-Cr residuals. When a value of the syntax element "same_qp_table_for_chroma" equals to 1, it specifies that only one Chroma QP table is signaled and this table applies to Cb, Cr and joint Cb-Cr residuals. When a value of "same_qp_table_for_chroma" equals to 0, it represents that three Chroma QP mapping tables are signaled in the SPS.

The syntax elements num_points_in_qp_table_minus1[i], delta_qp_in_val_minus1[i][j], delta_qp_out_val[i][j] are further used to derive the Chroma QP mapping tables. The semantics of these syntax elements and the procedure to derive the Chorma QP mapping tables is as shown below:

num_points_in_qp_table_minus1[i] plus 1 specifies the number of points used to describe the i-th chroma QP mapping table. The value of num_points_in_qp_table_minus1[i] shall be in the range of 0 to 63+QpBdOffsetc, inclusive. When num_points_in_qp_table_minus1 [0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1 [0][j] is inferred to be equal to 0.

delta_qp_out_val[i][j] specifies a delta value used to derive the output coordinate of the j-th pivot point of the i-th chroma QP mapping table. When delta_qp_out_val[0][j] is not present in the bitstream, the value of delta_qp_out_val[0][j] is inferred to be equal to 0.

The i-th chroma QP mapping table ChromaQpTable[i] for i=0 . . . same_qp_table_for_chroma?0:2 is derived as follows:

```
qpInVal[ i ][ 0 ] = -QpBdOffset_C + delta_qp_in_val_minus1[ i ][ 0 ]
qpOutVal[ i ][ 0 ] = -QpBdOffset_C + delta_qp_out_val[ i ][ 0 ]
for( j = 1; j <= num_points_in_qp_table_minus1[ i ]; j++ ) {
    qpInVal[ i ][ j ] = qpInVal[ i ][ j - 1 ] + delta_qp_in_val_minus1[ i ][ j ] + 1
    qpOutVal[ i ][ j ] = qpOutVal[ i ][ j - 1 ] + delta_qp_out_val[ i ][ j ]
}
ChromaQpTable[ i ][ qpInVal[ i ][ 0 ] ] = qpOutVal[ i ][ 0 ]
for( k = qpInVal[ i ][ 0 ] - 1; k >= -QpBdOffset_C; k -- )
ChromaQpTable[ i ][ k ] = Clip3( -QpBdOffset_C, 63, ChromaQpTable[ i ][ k + 1 ] - 1 )
    (7-31)
for( j = 0; j < num_points_in_qp_table_minus1[ i ]; j++ ) {
    sh = ( delta_qp_in_val_minus1[ i ][j + 1 ] + 2 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            (    delta_qp_out_val[ i ][j +1]    *    m    +    sh    )    /
( delta_qp_in_val_minus1[ i ][j + 1] + 1 )
}
for( k = qpInVal[ i ][ num_points_in_qp_table_minus1[ i ] ] + 1; k <= 63; k++ )
ChromaQpTable[ i ][ k ] = Clip3( -QpBdOffset_C, 63, ChromaQpTable[ i ][ k - 1 ] + 1 )
```

When same_qp_table_for_chroma is equal to 1, ChromaQpTable[1][k] and ChromaQpTable[2][k] are set equal to ChromaQpTable[0][k] for k=-QpBdOffsetc . . . 63.

It is a requirement of bitstream conformance that the values of qpInVal[i][j] and qpOutVal[i][j] shall be in the range of -QpBdOffsetc to 63, inclusive for i=0 . . . same_qp_table_for_chroma?0:2 and j=0 . . . num_points_in_qp_table_minus1 [i]. Please note that ChormaQPmapping table can also be expressed using a simple formula which takes as input the luma QP value ($QP_i$) and the color component value (cIdx) and then output the corresponding Chroma Qp value ($QP_c$). The formula may depict a linear relationship between the Luma QP and chroma QP. For e.g. the formula can be as follows: $QP_c = QP_i - x$ where x is constant dependent on the color component value (cIdx) and x can take different values for different color component indexes including the joint Cb-Cr component.

8.8.3 Deblocking Filter Process
8.8.3.1 General

Inputs to this process are the reconstructed picture prior to deblocking, i.e., the array recPicture$_L$ and, when ChromaArrayType is not equal to 0, the arrays recPicture$_{Cb}$ and recPicture$_{Cr}$.

Outputs of this process are the modified reconstructed picture after deblocking, i.e., the array recPicture$_L$ and, when ChromaArrayType is not equal to 0, the arrays recPicture$_{Cb}$ and recPicture$_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,

Edges that coincide with the boundaries of a subpicture with subpicture index subpicIdx and loop_filter_across_subpic_enabled_flag[subpicIdx] is equal to 0, Edges that coincide with the virtual boundaries of the picture when VirtualBoundariesPresentFlag is equal to 1, Edges that coincide with tile boundaries when loop_filter_across_tiles_enabled_flag is equal to 0, Edges that coincide with slice boundaries when loop_filter_across_slices_enabled_flag is equal to 0, Edges that coincide with upper or left boundaries of slices with slice_deblocking_filter_disabled_flag equal to 1, Edges within slices with slice_deblocking_filter_disabled_flag equal to 1, Edges that do not correspond to 4×4 sample grid boundaries of the luma component, Edges that do not correspond to 8×8 sample grid boundaries of the chroma component, Edges within the luma component for which both sides of the edge have intra_bdpcm_luma_flag equal to 1, Edges within the chroma components for which both sides of the edge have intra_bdpcm_chroma_flag equal to 1, Edges of chroma subblocks that are not edges of the associated transform unit.

The edge type, vertical or horizontal, is represented by the variable edgeType as specified in Table 42.

TABLE 42

Name of association to edgeType

| edgeType | Name of edgeType |
|---|---|
| 0 (vertical edge) | EDGE_VER |
| 1 (horizontal edge) | EDGE_HOR |

When slice_deblocking_filter_disabled_flag of the current slice is equal to 0, the following applies:

The variable treeType is set equal to DUAL_TREE_LUMA.

The vertical edges are filtered by invoking the deblocking filter process for one direction as specified in clause 8.8.3.2 with the variable treeType, the reconstructed picture prior to deblocking, i.e., the array recPicture$_L$ and the variable edgeType set equal to EDGE_VER as inputs, and the modified reconstructed picture after deblocking, i.e., the array recPicture$_L$ as outputs.

The horizontal edge are filtered by invoking the deblocking filter process for one direction as specified in clause 8.8.3.2 with the variable treeType, the modified reconstructed picture after deblocking, i.e., the array recPicture$_L$ and the variable edgeType set equal to EDGE_HOR as inputs, and the modified reconstructed picture after deblocking, i.e., the array recPicture$_L$ as outputs.

When ChromaArrayType is not equal to 0, the following applies:

The variable treeType is set equal to DUAL_TREE_CHROMA

The vertical edges are filtered by invoking the deblocking filter process for one direction as specified in clause 8.8.3.2 with the variable treeType, the reconstructed picture prior to deblocking, i.e., the arrays recPicture$_{Cb}$ and recPicture$_{Cr}$, and the variable edgeType set equal to EDGE_VER as inputs, and the modified reconstructed picture after deblocking, i.e., the arrays recPicture$_{Cb}$ and recPicture$_{Cr}$ as outputs.

The horizontal edge are filtered by invoking the deblocking filter process for one direction as specified in clause 8.8.3.2 with the variable treeType, the modified reconstructed picture after deblocking, i.e., the arrays recPicture$_{Cb}$ and recPicture$_{Cr}$, and the variable edgeType set equal to EDGE_HOR as inputs, and the modified reconstructed picture after deblocking, i.e., the arrays recPicture$_{Cb}$ and recPicture$_{Cr}$ as outputs.

8.8.3.2 Deblocking Filter Process for One Direction

Inputs to this process are:
the variable treeType specifying whether the luma (DUAL_TREE_LUMA) or chroma components (DUAL_TREE_CHROMA) are currently processed,
when treeType is equal to DUAL_TREE_LUMA, the reconstructed picture prior to deblocking, i.e., the array recPicture$_L$,
when ChromaArrayType is not equal to 0 and treeType is equal to DUAL_TREE_CHROMA, the arrays recPicture$_{Cb}$ and recPicture$_{Cr}$,
a variable edgeType specifying whether a vertical (EDGE_VER) or a horizontal (EDGE_HOR) edge is filtered.

Outputs of this process are the modified reconstructed picture after deblocking, i.e:
when treeType is equal to DUAL_TREE_LUMA, the array recPicture$_L$,
when ChromaArrayType is not equal to 0 and treeType is equal to DUAL_TREE_CHROMA, the arrays recPicture$_{Cb}$ and recPicture$_{Cr}$.

The variables firstCompIdx and lastCompIdx are derived as follows:

$$\text{firstCompIdx} = (\text{treeType}==\text{DUAL\_TREE\_CHROMA})?1:0 \quad (1244)$$

$$\text{lastCompIdx} = (\text{treeType}==\text{DUAL\_TREE\_LUMA} \,\|\, \text{ChromaArrayType}==0)?0:2 \quad (1245)$$

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edgeType is equal to EDGE_VER and xCb % 8 is equal 0, or when cIdx is not equal to 0 and edgeType is equal to EDGE_HOR and yCb % 8 is equal to 0, the edges are filtered by the following ordered operations:

The variable filterEdgeFlag is derived as follows:

If edgeType is equal to EDGE_VER and one or more of the following conditions are true, filterEdgeFlag is set equal to 0:

The left boundary of the current coding block is the left boundary of the picture.

The left boundary of the current coding block coincides with the left boundary of the current subpicture and loop_filter_across_subpic_enabled_flag[CurrSubpicIdx] or loop_filter_across_subpic_enabled_flag [subpicIdx] is equal to 0, where subpicIdx is the subpicture index of the subpicture for which the left boundary of the current coding block coincides with the right subpicture boundary of that subpicture.

The left boundary of the current coding block is the left boundary of the tile and loop_filter_across_tiles_enabled_flag is equal to 0.

The left boundary of the current coding block is the left boundary of the slice and loop_filter_across_slices_enabled_flag is equal to 0.

The left boundary of the current coding block is one of the vertical virtual boundaries of the picture and VirtualBoundariesPresentFlag is equal to 1.

Otherwise, if edgeType is equal to EDGE_HOR and one or more of the following conditions are true, the variable filterEdgeFlag is set equal to 0:

The top boundary of the current luma coding block is the top boundary of the picture.

The top boundary of the current coding block coincides with the top boundary of the current subpicture and loop_filter_across_subpic_enabled_flag[CurrSubpicIdx] or loop_filter_across_subpic_enabled_flag[subpicIdx] is equal to 0, where subpicIdx is the subpicture index of the subpicture for which the top boundary of the current coding block coincides with the bottom subpicture boundary of that subpicture.

The top boundary of the current coding block is the top boundary of the tile and loop_filter_across_tiles_enabled_flag is equal to 0.

The top boundary of the current coding block is the top boundary of the slice and loop_filter_across_slices_enabled_flag is equal to 0.

The top boundary of the current coding block is one of the horizontal virtual boundaries of the picture and VirtualBoundariesPresentFlag is equal to 1.

Otherwise, filterEdgeFlag is set equal to 1.

All elements of the two-dimensional (nCbW)×(nCbH) array edgeFlags, maxFilterLengthQs and maxFilterlengthPs are initialized to be equal to zero.

The derivation process of transform block boundary specified in clause 8.8.3.3 is invoked with the location (xCb, yCb), the coding block width nCbW, the coding block height nCbH, the variable cIdx, the variable filterEdgeFlag, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.

When cIdx is equal to 0, the derivation process of coding subblock boundary specified in clause 8.8.3.4 is invoked with the location (xCb, yCb), the coding block width nCbW, the coding block height nCbH, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.

The picture sample array recPicture is derived as follows:

If cIdx is equal to 0, recPicture is set equal to the reconstructed luma picture sample array prior to deblocking recPicture$_L$.

Otherwise, if cIdx is equal to 1, recPicture is set equal to the reconstructed chroma picture sample array prior to deblocking recPicture$_{Cb}$.

Otherwise (cIdx is equal to 2), recPicture is set equal to the reconstructed chroma picture sample array prior to deblocking recPicture$_{Cr}$.

The derivation process of the boundary filtering strength specified in clause 8.8.3.5 is invoked with the picture sample array recPicture, the luma location (xCb, yCb), the coding block width nCbW, the coding block height nCbH, the variable edgeType, the variable cIdx, and the array edgeFlags as inputs, and an (nCbW)×(nCbH) array bS as output.

The edge filtering process for one direction is invoked for a coding block as specified in clause 8.8.3.6 with the variable edgeType, the variable cIdx, the reconstructed picture prior to deblocking recPicture, the location (xCb, yCb), the coding block width nCbW, the coding block height nCbH, and the arrays bS, maxFilterLengthPs, and maxFilterLengthQs, as inputs, and the modified reconstructed picture recPicture as output.

8.8.3.3 Derivation Process of Transform Block Boundary

Inputs to this process are:
a location (xCb, yCb) specifying the top-left sample of the current coding block relative to the top-left sample of the current picture,
a variable nCbW specifying the width of the current coding block,
a variable nCbH specifying the height of the current coding block,
a variable cIdx specifying the colour component of the current coding block,
a variable filterEdgeFlag,
a two-dimensional (nCbW)×(nCbH) array edgeFlags,
two-dimensional (nCbW)×(nCbH) arrays maxFilterLengthQs and maxFilterLengthPs,
a variable edgeType specifying whether a vertical (EDGE_VER) or a horizontal (EDGE_HOR) edge is filtered.

Outputs of this process are:
the modified two-dimensional (nCbW)×(nCbH) array edgeFlags,
the modified two-dimensional (nCbW)×(nCbH) arrays maxFilterLengthQs, maxFilterLengthPs.

Depending on edgeType, the arrays edgeFlags, maxFilterLengthPs and maxFilterLengthQs are derived as follows:

The variable gridSize is set as follows:

$$\text{gridSize} = cIdx == 0 ? 4 : 8 \quad (1246)$$

If edgeType is equal to EDGE_VER, the following applies:

The variable numEdges is set equal to Max(1, nCbW/gridSize).

For xEdge=0 . . . numEdges−1 and y=0 . . . nCbH−1, the following applies:

The horizontal position x inside the current coding block is set equal to xEdge*gridSize.

The value of edgeFlags[x][y] is derived as follows:
If VirtualBoundariesPresentFlag equal to 1 and (xCb+x) is equal to VirtualBoundariesPosX[n] for any n=0 . . . NumVerVirtualBoundaries−1, edgeFlags[x][y] is set equal to 0.

Otherwise, if x is equal to 0, edgeFlags[x][y] is set equal to filterEdgeFlag.

Otherwise, if the location (xCb+x, yCb+y) is at a transform block edge, edgeFlags[x][y] is set equal to 1.

When edgeFlags[x][y] is equal to 1, the following applies:

If cIdx is equal to 0, the following applies:
The value of maxFilterLengthQs[x][y] is derived as follows:
If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthQs[x][y] is set equal to 1.

Otherwise, if the width in luma samples of the transform block at luma location (xCb+x, yCb+y) is equal to or greater than 32, maxFilterLengthQs[x][y] is set equal to 7.

Otherwise, maxFilterLengthQs[x][y] is set equal to 3.

The value of maxFilterLengthPs[x][y] is derived as follows:
If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthPs[x][y] is set equal to 1.

Otherwise, if the width in luma samples of the transform block at luma location (xCb+x−1, yCb+y) is equal to or greater than 32, maxFilterLengthPs[x][y] is set equal to 7.

Otherwise, maxFilterLengthPs[x][y] is set equal to 3.

Otherwise (cIdx is not equal to 0), the values of maxFilterLengthPs[x][y] and maxFilterLengthQs[x][y] are derived as follows:

If the width in chroma samples of the transform block at chroma location (xCb+x, yCb+y) and the width at chroma location (xCb+x−1, yCb+y) are both equal to or greater than 8, maxFilterLengthPs[x][y] and maxFilterLengthQs[x][y] are set equal to 3.

Otherwise, maxFilterLengthPs[x][y] and maxFilterLengthQs[x][y] are set equal to 1.

Otherwise (edgeType is equal to EDGE_HOR), the following applies:

The variable numEdges is set equal to Max(1, nCbH/gridSize).

For yEdge=0 . . . numEdges−1 and x=0 . . . nCbW−1, the following applies:

The vertical position y inside the current coding block is set equal to yEdge*gridSize.

The value of edgeFlags[x][y] is derived as follows:

If VirtualBoundariesPresentFlag equal to 1 and (yCb+y) is equal to VirtualBoundariesPosY[n] for any n=0 . . . NumHorVirtualBoundaries−1, edgeFlags[x][y] is set equal to 0.

Otherwise, if y is equal to 0, edgeFlags[x][y] is set equal to filterEdgeFlag.

Otherwise, if the location (xCb+x, yCb+y) is at a transform block edge, edgeFlags[x][y] is set equal to 1.

When edgeFlags[x][y] is equal to 1, the following applies:

If cIdx is equal to 0, the following applies:

The value of maxFilterLengthQs[x][y] is derived as follows:

If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthQs[x][y] is set equal to 1.

Otherwise, if the height in luma samples of the transform block at luma location (xCb+x, yCb+y) is equal to or greater than 32, maxFilterLengthQs[x][y] is set equal to 7.

Otherwise, maxFilterLengthQs[x][y] is set equal to 3.

The value of maxFilterLengthPs[x][y] is derived as follows:

If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthPs[x][y] is set equal to 1.

Otherwise, if the height in luma samples of the transform block at luma location (xCb+x, yCb+y−1) is equal to or greater than 32, maxFilterLengthPs[x][y] is set equal to 7.

Otherwise, maxFilterLengthPs[x][y] is set equal to 3.

Otherwise (cIdx is not equal to 0), the values of maxFilterLengthPs[x][y] and maxFilterLengthQs[x][y] are derived as follows:

If the height in chroma samples of the transform block at chroma location (xCb+x, yCb+y) and the height in chroma samples of the transform block at chroma location (xCb+x, yCb+y−1) are both equal to or greater than 8, the following applies:

If (yCb+y) % CtbHeightC is greater than 0, i.e. the horizontal edge do not overlap with the upper chroma CTB boundary, both maxFilterLengthPs[x][y] and maxFilterLengthQs[x][y] are set equal to 3

Otherwise ((yCb+y) % CtbHeightC is equal to 0, i.e. the horizontal edge overlaps with the upper chroma CTB boundary), maxFilterLengthPs[x][y] is set equal to 1 and maxFilterLengthQs[x][y] is set equal to 3.

Otherwise, maxFilterLengthPs[x][y] and maxFilterLengthQs[x][y] are set equal to 1.

8.8.3.4 Derivation Process of Coding Subblock Boundary

Inputs to this process are:

a location (xCb, yCb) specifying the top-left sample of the current coding block relative to the top-left sample of the current picture, a variable nCbW specifying the width of the current coding block, a variable nCbH specifying the height of the current coding block, a two-dimensional (nCbW)×(nCbH) array edgeFlags, two-dimensional (nCbW)×(nCbH) arrays maxFilterLengthQs and maxFilterLengthPs, a variable edgeType specifying whether a vertical (EDGE_VER) or a horizontal (EDGE_HOR) edge is filtered.

Outputs of this process are:

the modified two-dimensional (nCbW)×(nCbH) array edgeFlags, the modified two-dimensional (nCbW)×(nCbH) arrays maxFilterLengthQs and maxFilterLengthPs.

The number of coding subblock in horizontal direction numSbX and in vertical direction numSbY are derived as follows:

If inter_affine_flag[xCb][yCb] is equal to 1 or merge_subblock_flag[xCb][yCb] is equal to 1, numSbX and numSbY are set equal to NumSbX[xCb][yCb] and NumSbY[xCb][yCb], respectively.

Otherwise, numSbX and numSbY are both set equal to 1.

Depending on the value of edgeType the following applies:

If edgeType is equal to EDGE_VER, the following applies:

The variable sbW is set equal to Max(8, nCbW/numSbX).

The array edgeTbFlags is set equal to edgeFlags.

For xEdge=0 . . . min((nCbW/8)−1, numSbX−1), y=0 . . . nCbH−1:

The horizontal position x inside the current coding block is set equal to xEdge*sbW.

The value of edgeFlags[x][y] is derived as follows:
If VirtualBoundariesPresentFlag is equal to 1 and x is equal to VirtualBoundariesPosX[n] for any n=0 . . . NumVerVirtualBoundaries−1, the following applies:

edgeFlags[x][y]=0     (1247)

Otherwise, the following applies:

edgeFlags[x][y]=2     (1248)

When edgeFlags[x][y] is equal to 1 or 2, the values of maxFilterLengthPs[x][y] and maxFilterLengthQs[x][y] are modified as follows:
If x is equal to 0, the following applies:
When numSbX is greater than 1, the following applies:

maxFilterLengthQs[x][y]=Min(5,maxFilterLengthQs [x][y])     (1249)

When inter_affine_flag[xCb−1][yCb+y] is equal to 1 or merge_subblock_flag[xCb−1][yCb+y] is equal to 1, the following applies:

maxFilterLengthPs[x][y]=Min(5,maxFilterLengthPs [x][y])     (1250)

Otherwise, if edgeTbFlags[x][y] is equal to 1, the following applies:

maxFilterLengthPs[x][y]=Min(5,maxFilterLengthPs [x][y])     (1251)

maxFilterLengthQs[x][y]=Min(5,maxFilterLengthQs [x][y])     (1252)

Otherwise, if one or more of the following conditions are true:
(x+4) is greater than or equal to nCbW,
edgeTbFlags[x−4][y] is equal to 1,
edgeTbFlags[x+4][y] is equal to 1,
the following applies:

maxFilterLengthPs[x][y]=1     (1253)

maxFilterLengthQs[x][y]=1     (1254)

Otherwise, if one or more of the following conditions are true:
xEdge is equal to 1,
xEdge is equal to (nCbW/8)−1,
edgeTbFlags[x−sbW][y] is equal to 1,
edgeTbFlags[x+sbW][y] is equal to 1,
the following applies:

maxFilterLengthPs[x][y]=2     (1255)

maxFilterLengthQs[x][y]=2     (1256)

Otherwise, the following applies:

maxFilterLengthPs[x][y]=3     (1257)

maxFilterLengthQs[x][y]=3     (1258)

Otherwise, if edgeType is equal to EDGE_HOR, the following applies:
The variable sbH is set equal to Max(8, nCbH/numSbY).
The array edgeTbFlags is set equal to edgeFlags.
For yEdge=0 . . . min((nCbH/8)−1, numSbY−1), x=0 . . . nCbW−1:
The vertical position y inside the current coding block is set equal to yEdge*sbH.

The value of edgeFlags[x][y] is derived as follows:
If VirtualBoundariesPresentFlag is equal to 1 and y is equal to VirtualBoundariesPosY[n] for any n=0 . . . NumHorVirtualBoundaries−1, the following applies:

edgeFlags[x][y]=0     (1259)

Otherwise, the following applies:

edgeFlags[x][y]=2     (1260)

When edgeFlags[x][y] is equal to 1 or 2, the values of maxFilterLengthPs[x][y] and maxFilterLengthQs[x][y] are modified as follows:
If y is equal to 0, the following applies:
When numSbY is greater than 1, the following applies:

maxFilterLengthQs[x][y]=Min(5,maxFilterLengthQs [x][y])     (1261)

When inter_affine_flag[xCb+x][yCb−1] is equal to 1 or merge_subblock_flag[xCb+x][yCb−1] is equal to 1, the following applies:

maxFilterLengthPs[x][y]=Min(5,maxFilterLengthPs [x][y])     (1262)

Otherwise, if edgeTbFlags[x][y] is equal to 1, the following applies:

maxFilterLengthPs[x][y]=Min(5,maxFilterLengthPs [x][y])     (1263)

maxFilterLengthQs[x][y]=Min(5,maxFilterLengthQs [x][y])     (1264)

Otherwise, if one or more of the following conditions are true:
(y+4) is greater than or equal to nCbH,
edgeTbFlags[x][y−4] is equal to 1,
edgeTbFlags[x][y+4] is equal to 1,
the following applies:

maxFilterLengthPs[x][y]=1     (1265)

maxFilterLengthQs[x][y]=1     (1266)

Otherwise, if one or more of the following conditions are true:
yEdge is equal to 1,
yEdge is equal to (nCbH/8)−1,
edgeTbFlags[x][y−sbH] is equal to 1,
edgeTbFlags[x][y+sbH] is equal to 1,
the following applies:

maxFilterLengthPs[x][y]=2     (1267)

maxFilterLengthQs[x][y]=2     (1268)

Otherwise, the following applies:

maxFilterLengthPs[x][y]=3     (1269)

maxFilterLengthQs[x][y]=3     (1270)

8.8.3.5 Derivation Process of Boundary Filtering Strength
Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered, a variable cIdx specifying the colour component of the current coding block, a two-dimensional (nCbW)×(nCbH) array edgeFlags.

Output of this process is a two-dimensional (nCbW)×(nCbH) array bS specifying the boundary filtering strength.

The variables $xD_i$, $yD_j$, xN and yN are derived as follows:

The variable gridSize is set as follows:

$$\text{gridSize} = cIdx == 0 ? 4 : 8 \quad (1271)$$

If edgeType is equal to EDGE_VER, $$xD_i = (i * \text{gridSize}) \quad (1272)$$

$$yD_j = cIdx == 0 ? (j << 2) : (j << 1) \quad (1273)$$

$$xN \text{ is set equal to Max}(0, (nCbW/\text{gridSize}) - 1) \quad (1274)$$

$$yN = cIdx == 0 ? (nCbH/4) - 1 : (nCbH/2) - 1 \quad (1275)$$

Otherwise (edgeType is equal to EDGE_HOR), $$xD_i = cIdx == 0 ? (i << 2) : (i << 1) \quad (1276)$$

$$yD_j = j * \text{gridSize} \quad (1277)$$

$$xN = cIdx == 0 ? (nCbW/4) - 1 : (nCbW/2) - 1 \quad (1278)$$

$$yN = \text{Max}(0, (nCbH/\text{gridSize}) - 1) \quad (1279)$$

For $xD_i$ with i=0 . . . xN and $yD_j$ with j=0 . . . yN, the following applies:

If edgeFlags[$xD_i$][$yD_j$] is equal to 0, the variable bS[$xD_i$][$yD_j$] is set equal to 0.

Otherwise, the following applies:

The sample values $p_0$ and $q_0$ are derived as follows:

If edgeType is equal to EDGE_VER, $p_0$ is set equal to recPicture[xCb+$xD_i$−1][yCb+$yD_j$] and $q_0$ is set equal to recPicture[xCb+][yCb+$yD_j$].

Otherwise (edgeType is equal to EDGE_HOR), $p_0$ is set equal to recPicture[xCb+][yCb+$yD_j$−1] and $q_0$ is set equal to recPicture[xCb+$xD_i$][yCb+$yD_j$].

The variable bS[$xD_i$][$yD_j$] is derived as follows:

If cIdx is equal to 0 and both samples $p_0$ and $q_0$ are in a coding block with intra_bdpcm_luma_flag equal to 1, bS[$xD_i$][$yD_j$] is set equal to 0.

Otherwise, if cIdx is greater than 0 and both samples $p_0$ and $q_0$ are in a coding block with intra_bdpcm_chroma_flag equal to 1, bS[$xD_i$][$yD_j$] is set equal to 0.

Otherwise, if the sample $p_0$ or $q_0$ is in the coding block of a coding unit coded with intra prediction mode, bS[$xD_i$][$yD_j$] is set equal to 2.

Otherwise, if the block edge is also a coding block edge and the sample $p_0$ or $q_0$ is in a coding block with ciip_flag equal to 1, bS[$xD_i$][$yD_j$] is set equal to 2.

Otherwise, if the block edge is also a transform block edge and the sample $p_0$ or $q_0$ is in a transform block which contains one or more non-zero transform coefficient levels, bS[$xD_i$][$yD_j$] is set equal to 1.

Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), bS[$xD_i$][$yD_j$] is set equal to 1.

Otherwise, if cIdx is equal to 0, edgeFlagsbS[$xD_i$][$yD_j$] is equal to 2, and one or more of the following conditions are true, bS[$xD_i$][$yD_j$] is set equal to 1:

The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

8.8.3.6 Edge Filtering Process for One Direction

Inputs to this process are:

a variable edgeType specifying whether vertical edges (EDGE_VER) or horizontal edges (EDGE_HOR) are currently processed, a variable cIdx specifying the current colour component, the reconstructed picture prior to deblocking recPicture, a location (xCb, yCb) specifying the top-left sample of the current coding block relative to the top-left sample of the current picture, a variable nCbW specifying the width of the current coding block, a variable nCbH specifying the height of the current coding block, the array bS specifying the boundary strength, the arrays maxFilterLengthPs and maxFilterLengthQs.

Output of this process is the modified reconstructed picture after deblocking recPicture.

For the edge filtering process, the following applies:

The variable gridSize is set as follows:

$$\text{gridSize}=\text{cIdx}==0?4:8 \tag{1280}$$

The variables subW, subH, xN, yN are derived as follows:

$$\text{subW}=\text{cIdx}==0?1:\text{SubWidthC} \tag{1281}$$

$$\text{subH}=\text{cIdx}==0?1:\text{SubHeightC} \tag{1282}$$

$$xN=\text{edgeType}==\text{EDGE\_VER}?\text{Max}(0,(nCbW/\text{grid-Size})-1):(nCbW/4/\text{sub}W)-1 \tag{1283}$$

$$yN=\text{edgeType}==\text{EDGE\_VER}?(nCbH/4/\text{sub}H)-1:\text{Max}(0,(nCbH/\text{gridSize})-1) \tag{1284}$$

The variables $xD_k$ with $k=0\ldots xN$ and $yDm$ with $m=0\ldots yN$ are derived as follows:

$$xD_k=\text{edgeType}==\text{EDGE\_VER}?(k*\text{gridSize}):(k<<(2/\text{sub}W)) \tag{1285}$$

$$yD_m=\text{edgeType}==\text{EDGE\_VER}?(m<<(2/\text{sub}H)):(m*\text{gridSize}) \tag{1286}$$

For $xD_k$ with $k=0\ldots xN$ and $yD_m$ with $m=0\ldots yN$, the following applies:

When $bS[xD_k][yD_m]$ is greater than 0, the following ordered operations apply:

If cIdx is equal to 0, the filtering process for edges in the luma coding block of the current coding unit consists of the following ordered operations:

1. The decision process for luma block edges as specified in clause 8.8.3.6.1 is invoked with the luma picture sample array recPicture, the location of the luma coding block (xCb, yCb), the luma location of the block (xBl, yBl) set equal to $(xD_k, yD_m)$, the edge direction edgeType, the boundary filtering strength $bS[xD_k][yD_m]$, the maximum filter lengths maxFilterLengthP set equal to maxFilterLengthPs$[xD_k][yD_m]$ and maxFilterLengthQ set equal to maxFilterLengthQs$[xD_k][yD_m]$ as inputs, and the decisions dE, dEp and dEq, the modified maximum filter lengths maxFilterLengthP and maxFilterLengthQ, and the variable $t_C$ as outputs.

2. The filtering process for block edges as specified in clause 8.8.3.6.2 is invoked with the luma picture sample array recPicture, the location of the luma coding block (xCb, yCb), the luma location of the block (xBl, yBl) set equal to $(xD_k, yD_m)$, the edge direction edgeType, the decisions dE, dEp and dEq, the maximum filter lengths maxFilterLengthP and maxFilterLengthQ, and the variable $t_C$ as inputs, and the modified luma picture sample array recPicture as output.

Otherwise (cIdx is not equal to 0), the filtering process for edges in the chroma coding block of current coding unit specified by cIdx consists of the following ordered operations:

1. The decision process for chroma block edges as specified in clause 8.8.3.6.3 is invoked with the chroma picture sample array recPicture, the location of the chroma coding block (xCb, yCb), the location of the chroma block (xBl, yBl) set equal to $(xD_k, yD_m)$, the edge direction edgeType, the variable cIdx, the boundary filtering strength $bS[xD_k][yD_m]$, the maximum filter lengths maxFilterLengthP set equal to maxFilterLengthPs$[xD_k][yD_m]$ and the maximum filter lengths maxFilterLengthQ set equal to maxFilterLengthQs$[xD_k][yD_m]$ as inputs, and the modified maximum filter lengths maxFilterLengthP and maxFilterLengthQ, and the variable $t_C$ as outputs.

2. When maxFilterLengthQ is greater than 0, the filtering process for chroma block edges as specified in clause 8.8.3.6.4 is invoked with the chroma picture sample array recPicture, the location of the chroma coding block (xCb, yCb), the chroma location of the block (xBl, yBl) set equal to $(xD_k, yD_m)$, the edge direction edgeType, the variable $t_C$, the maximum filter lengths maxFilterLengthP and maxFilterLengthQ as inputs, and the modified chroma picture sample array recPicture as output.

8.8.3.6.1 Decision Process for Luma Block Edges

Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, a variable bS specifying the boundary filtering strength, a variable maxFilterLengthP specifying the maximum filter length, a variable maxFilterLengthQ specifying the maximum filter length.

Outputs of this process are:

the variables dE, dEp and dEq containing decisions, the modified filter length variables maxFilterLengthP and maxFilterLengthQ, the variable $t_C$.

The sample values $p_{i,k}$ and $q_{j,k}$ with $i=0\ldots\text{Max}(2,\text{maxFilterLengthP})$, $j=0\ldots\text{Max}(2,\text{maxFilterLengthQ})$ and $k=0$ and 3 are derived as follows:

If edgeType is equal to EDGE_VER, the following applies:

$$q_{j,k}=\text{recPicture}[xCb+xBl+j][yCb+yBl+k] \tag{1287}$$

$$p_{i,k}=\text{recPicture}[xCb+xBl-i-1][yCb+yBl+k] \tag{1288}$$

Otherwise (edgeType is equal to EDGE_HOR), the following applies:

$$q_{j,k}=\text{recPicture}[xCb+xBl+k][yCb+yBl+j] \quad (1289)$$

$$p_{i,k}=\text{recPicture}[xCb+xBl+k][yCb+yBl-i-1] \quad (1290)$$

The variable qpOffset is derived as follows:
If sps_ladf_enabled_flag is equal to 1, the following applies:
 The variable lumaLevel of the reconstructed luma level is derived as follow:

$$\text{lumaLevel}=((p_{0,0}+p_{0,3}+q_{0,0}+q_{0,3})>>2), \quad (1291)$$

The variable qpOffset is set equal to sps_ladf_lowest_interval_qp_offset and modified as follows:

```
for( i = 0; i < sps_num_ladf_intervals_minus2 + 1; i++ ) {
    if( lumaLevel > SpsLadfIntervalLowerBound[ i + 1 ] )
        qpOffset = sps_ladf_qp_offset[ i ]                    (1292)
    else
        break
}
```

Otherwise, qpOffset is set equal to 0.
The variables $Qp_Q$ and $Qp_P$ are set equal to the $Qp_Y$ values of the coding units which include the coding blocks containing the sample $q_{0,0}$ and $p_{0,0}$, respectively.
The variable qP is derived as follows:

$$qP=((Qp_Q+Qp_P+1)>>1)+qpOffset \quad (1293)$$

The value of the variable β' is determined as specified in Table 43 based on the quantization parameter Q derived as follows:

$$Q=\text{Clip3}(0,63,qP+(\text{slice\_beta\_offset\_div2}<<1)) \quad (1294)$$

where slice_beta_offset_div2 is the value of the syntax element slice_beta_offset_div2 for the slice that contains sample $q_{0,0}$.
The variable β is derived as follows:

$$(\beta=\beta'^{*}(1<<(\text{BitDepth}-8))) \quad (1295)$$

The value of the variable $t_C'$ is determined as specified in Table 43 based on the quantization parameter Q derived as follows:

$$Q=\text{Clip3}(0,65,qP+2^{*}(bS-1)+(\text{slice\_tc\_offset\_div2}<<1)) \quad (1296)$$

where slice_tc_offset_div2 is the value of the syntax element slice_tc_offset_div2 for the slice that contains sample $q_{0,0}$.
The variable $t_C$ is derived as follows:

$$t_C=\text{BitDepth}<10?(t_C'+2)>>(10-\text{BitDepth}):t_C'^{*}(1<<(\text{BitDepth}-10)) \quad (1297)$$

The following ordered operations apply:
The variables dp0, dp3, dq0 and dq3 are derived as follows:

$$dp0=\text{Abs}(p_{2,0}-2^{*}p_{1,0}+p_{0,0}) \quad (1298)$$

$$dp3=\text{Abs}(p_{2,3}-2^{*}p_{1,3}+p_{0,3}) \quad (1299)$$

$$dq0=\text{Abs}(q_{2,0}-2^{*}q_{1,0}+q_{0,0}) \quad (1300)$$

$$dq3=\text{Abs}(q_{2,3}-2^{*}q_{1,3}+q_{0,3}) \quad (1301)$$

When maxFilterLengthP and maxFilterLengthQ both are equal to or greater than 3 the variables sp0, sq0, spq0, sp3, sq3 and spq3 are derived as follows:

$$sp0=\text{Abs}(p_{3,0}-p_{0,0}) \quad (1302)$$

$$sq0=\text{Abs}(q_{0,0}-q_{3,0}) \quad (1303)$$

$$spq0=\text{Abs}(p_{0,0}-q_{0,0}) \quad (1304)$$

$$sp3=\text{Abs}(p_{3,3}-p_{0,3}) \quad (1305)$$

$$sq3=\text{Abs}(q_{0,3}-q_{3,3}) \quad (1306)$$

$$spq3=\text{Abs}(p_{0,3}-q_{0,3}) \quad (1307)$$

1. The variables sidePisLargeBlk and sideQisLargeBlk are set equal to 0.
 When maxFilterLengthP is greater than 3, sidePisLargeBlk is set equal to 1.
 When maxFilterLengthQ is greater than 3, sideQisLargeBlk is set equal to 1.
 When edgeType is equal to EDGE_HOR and (yCb+yBl) % CtbSizeY is equal to 0, sidePisLargeBlk is set equal to 0.
The variables dSam0 and dSam3 are initialized to 0.
When sidePisLargeBlk or sideQisLargeBlk is greater than 0, the following applies:
 a. The variables dp0L, dp3L are derived and maxFilterLengthP is modified as follows:
  If sidePisLargeBlk is equal to 1, the following applies:

$$dp0L=(dp0+\text{Abs}(p_{5,0}-2^{*}p_{4,0}+p_{3,0})+1)>>1 \quad (1308)$$

$$dp3L=(dp3+\text{Abs}(p_{5,3}-2^{*}p_{4,3}+p_{3,3})+1)>>1 \quad (1309)$$

Otherwise, the following applies:

$$dp0L=dp0 \quad (1310)$$

$$dp3L=dp3 \quad (1311)$$

$$\text{maxFilterLength}P=3 \quad (1312)$$

b. The variables dq0L and dq3L are derived as follows:
  If sideQisLargeBlk is equal to 1, the following applies:

$$dq0L=(dq0+\text{Abs}(q_{5,0}-2^{*}q_{4,0}+q_{3,0})+1)>>1 \quad (1313)$$

$$dq3L=(dq3+\text{Abs}(q_{5,3}-2^{*}q_{4,3}+q_{3,3})+1)>>1 \quad (1314)$$

Otherwise, the following applies:

$$dq0L=dq0 \quad (1315)$$

$$dq3L=dq3 \quad (1316)$$

c. The variables sp0L and sp3L are derived as follows:
  If maxFilterLengthP is equal to 7, the following applies:

$$sp0L=sp0+\text{Abs}(p_{7,0}-p_{6,0}-p_{5,0}+p_{4,0}) \quad (1317)$$

$$sp3L=sp3+\text{Abs}(p_{7,3}-p_{6,3}-p_{5,3}+p_{4,3}) \quad (1318)$$

Otherwise, the following applies:

$$sp0L=sp0 \quad (1319)$$

$$sp3L=sp3 \quad (1320)$$

d. The variables sq0L and sq3L are derived as follows:
    If maxFilterLengthQ is equal to 7, the following applies:

$$sq0L = sq0 + \text{Abs}(q_{4,0} - q_{5,0} - q_{6,0} + q_{7,0}) \quad (1321)$$

$$sq3L = sq3 + \text{Abs}(q_{4,3} - q_{5,3} - q_{6,3} + q_{7,3}) \quad (1322)$$

Otherwise, the following applies:

$$sq0L = sq0 \quad (1323)$$

$$sq3L = sq3 \quad (1324)$$

e. The variables dpq0L, dpq3L, and dL are derived as follows:

$$dpq0L = dp0L + dq0L \quad (1325)$$

$$dpq3L = dp3L + dq3L \quad (1326)$$

$$dL = dpq0L + dpq3L \quad (1327)$$

f. When dL is less than 13, the following ordered operations apply:
    i. The variable dpq is set equal to 2*dpq0L.
       The variable sp is set equal to sp0L, the variable sq is set equal to sq0L and the variable spq is set equal to spq0.
       The variables $p_0$ $p_3$ $q_0$ and $q_3$ are first initialized to 0 and then modified according to sidePisLargeBlk and sideQisLargeBlk as follows:
         When sidePisLargeBlk is equal to 1, the following applies:

$$p_3 = p_{3,0} \quad (1328)$$

$$p_0 = p_{maxFilterLengthP,0} \quad (1329)$$

When sideQisLargeBlk is equal to 1, the following applies:

$$q_3 = q_{3,0} \quad (1330)$$

$$q_0 = q_{maxFilterLengthQ,0} \quad (1331)$$

For the sample location (xCb+xBl, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam0.

The variable dpq is set equal to 2*dpq3L.

The variable sp is set equal to sp3L, the variable sq is set equal to sq3L and the variable spq is set equal to spq3.

The variables $p_0$ $p_3$ $q_0$ and $q_3$ are first initialized to 0 and are then modified according to sidePisLargeBlk and sideQisLargeBlk as follows:
    When sidePisLargeBlk is equal to 1, the following applies:

$$p_3 = p_{3,3} \quad (1332)$$

$$p_0 = p_{maxFilterLengthP,3} \quad (1333)$$

When sideQisLargeBlk is equal to 1, the following applies:

$$q_3 = q_{3,3} \quad (1334)$$

$$q_0 = q_{maxFilterLengthQ,3} \quad (1335)$$

When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, (β and $t_C$ as inputs, and the output is assigned to the decision dSam3.

2. The variables dE, dEp and dEq are derived as follows:
    If dSam0 and dSam3 are both equal to 1, the variable dE is set equal to 3, dEp is set equal to 1, and dEq is set equal to 1.

Otherwise, the following ordered operations apply:
    The variables dpq0, dpq3, dp, dq and d are derived as follows:

$$dpq0 = dp0 + dq0 \quad (1336)$$

$$dpq3 = dp3 + dq3 \quad (1337)$$

$$dp = dp0 + dp3 \quad (1338)$$

$$dq = dq0 + dq3 \quad (1339)$$

$$d = dpq0 + dpq3 \quad (1340)$$

The variables dE, dEp, dEq, sidePisLargeBlk and sideQisLargeBlk are set equal to 0.

When d is less than 13 and both maxFilterLengthP and maxFilterLengthQ are greater than 2, the following ordered operations apply:

The variable dpq is set equal to 2*dpq0.

The variable sp is set equal to sp0, the variable sq is set equal to sq0 and the variable spq is set equal to spq0.

For the sample location (xCb+xBl, yCb+yBl), the decision process for a luma sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_C$ as inputs, and the output is assigned to the decision dSam0.

The variable dpq is set equal to 2*dpq3.

The variable sp is set equal to sp3, the variable sq is set equal to sq3 and the variable spq is set equal to spq3.

When edgeType is equal to EDGE_VER for the sample location (xCb+xBl, yCb+yBl+3) or when edgeType is equal to EDGE_HOR for the sample location (xCb+xBl+3, yCb+yBl), the decision process for a sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_C$ as inputs, and the output is assigned to the decision dSam3.

When d is less than β, the following ordered operations apply:

The variable dE is set equal to 1.

When dSam0 is equal to 1 and dSam3 is equal to 1, the variable dE is set equal to 2 and both maxFilterLengthP and maxFilterLengthQ are set equal to 3.

When maxFilterLengthP is greater than 1, and maxFilterLengthQ is greater than 1, and dp is less than $((3+(β>>1))>>3)$, the variable dEp is set equal to 1.

When maxFilterLengthP is greater than 1, and maxFilterLengthQ is greater than 1, and dq is less than $((3+(β>>1))>>3)$, the variable dEq is set equal to 1.

When dE is equal to 1, maxFilterLengthP is set equal to 1+dEp and maxFilterLengthQ is set equal to 1+dEq.

TABLE 43

Derivation of threshold variables β' and $t_C$' from input Q

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| β' | 0 | 0 | 0 | 0 | 0 | 0 | 0 | 0 | 0 | 0 | 0 | 0 | 0 | 0 | 0 | 0 | 6 |
| $t_C$' | 0 | 0 | 0 | 0 | 0 | 0 | 0 | 0 | 0 | 0 | 0 | 0 | 0 | 0 | 0 | 0 | 0 |

| Q | 17 | 18 | 19 | 20 | 21 | 22 | 23 | 24 | 25 | 26 | 27 | 28 | 29 | 30 | 31 | 32 | 33 |
|---|----|----|----|----|----|----|----|----|----|----|----|----|----|----|----|----|----|
| β' | 7 | 8 | 9 | 10 | 11 | 12 | 13 | 14 | 15 | 16 | 17 | 18 | 20 | 22 | 24 | 26 | 28 |
| $t_C$' | 0 | 3 | 4 | 4 | 4 | 4 | 5 | 5 | 5 | 5 | 7 | 7 | 8 | 9 | 10 | 10 | 11 |

| Q | 34 | 35 | 36 | 37 | 38 | 39 | 40 | 41 | 42 | 43 | 44 | 45 | 46 | 47 | 48 | 49 | 50 |
|---|----|----|----|----|----|----|----|----|----|----|----|----|----|----|----|----|----|
| β' | 30 | 32 | 34 | 36 | 38 | 40 | 42 | 44 | 46 | 48 | 50 | 52 | 54 | 56 | 58 | 60 | 62 |
| $t_C$' | 13 | 14 | 15 | 17 | 19 | 21 | 24 | 25 | 29 | 33 | 36 | 41 | 45 | 51 | 57 | 64 | 71 |

| Q | 51 | 52 | 53 | 54 | 55 | 56 | 57 | 58 | 59 | 60 | 61 | 62 | 63 | 64 | 65 |
|---|----|----|----|----|----|----|----|----|----|----|----|----|----|----|----|
| β' | 64 | 66 | 68 | 70 | 72 | 74 | 76 | 78 | 80 | 82 | 84 | 86 | 88 | — | — |
| $t_C$' | 80 | 89 | 100 | 112 | 125 | 141 | 157 | 177 | 198 | 222 | 250 | 280 | 314 | 352 | 395 |

8.8.3.6.2 Filtering Process for Luma Block Edges

Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, the variables dE, dEp and dEq containing decisions, the variables maxFilterLengthP and maxFilterLengthQ containing maximum filter lengths, the variable $t_C$.

Output of this process is the modified picture sample array recPicture.

Depending on the value of edgeType, the following applies:

If edgeType is equal to EDGE_VER, the following ordered operations apply:

The sample values $p_{i,k}$ and $q_{j,k}$ with i=0 . . . maxFilterLengthP, j=0 . . . maxFilterLengthQ and k=0 . . . 3 are derived as follows:

$q_{j,k}$=recPicture[xCb+xBl+j][yCb+yBl+k]  (1341)

$p_{i,k}$=recPicture[xCb+xBl−i−1][yCb+yBl+k]  (1342)

When dE is not equal to 0 and dE is not equal to 3, for each sample location (xCb+xBl, yCb+yBl+k), k=0 . . . 3, the following ordered operations apply:

The filtering process for a luma sample using short filters as specified in clause 8.8.3.6.6 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, the decision dE, the variables dEp and dEq and the variable $t_C$ as inputs, and the number of filtered samples nDp and nDq from each side of the block boundary and the filtered sample values $p_1$' and $q_j$' as outputs.

When nDp is greater than 0, the filtered sample values $p_i$' with i=0 . . . nDp−1 replace the corresponding samples inside the sample array recPicture as follows:

recPicture[xCb+xBl−i−1][yCb+yBl+k]=$p_i$'  (1343)

When nDq is greater than 0, the filtered sample values $q_j$' with j=0 . . . nDq−1 replace the corresponding samples inside the sample array recPicture as follows:

recPicture[xCb+xBl+j][yCb+yBl+k]=$q_j$'  (1344)

When dE is equal to 3, for each sample location (xCb+xBl, yCb+yBl+k), k=0 . . . 3, the following ordered operations apply:

The filtering process for a luma sample using long filters as specified in clause 8.8.3.6.7 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, and $t_C$ as inputs and the filtered samples values $p_i$' and $q_j$' as outputs.

The filtered sample values $p_i$' with i=0 . . . maxFilterLengthP−1 replace the corresponding samples inside the sample array recPicture as follows:

recPicture[xCb+xBl−i−1][yCb+yBl+k]=$p_i$'  (1345)

The filtered sample values $q_j$' with j=0 . . . maxFilterLengthQ−1 replace the corresponding samples inside the sample array recPicture as follows:

recPicture[xCb+xBl+j][yCb+yBl+k]=$q_j$'  (1346)

Otherwise (edgeType is equal to EDGE_HOR), the following ordered operations apply:

1. The sample values $p_{i,k}$ and $q_{j,k}$ with i=0 . . . maxFilterLengthP, j=0 . . . maxFilterLengthQ and k=0 . . . 3 are derived as follows:

$q_{j,k}$=recPicture[xCb+xBl+k][yCb+yBl+j]  (1347)

$p_{i,k}$=recPicture[xCb+xBl+k][yCb+yBl−i−1]  (1348)

2. When dE is not equal to 0 and dE is not equal to 3, for each sample location (xCb+xBl+k, yCb+yBl), k=0 . . . 3, the following ordered operations apply:
  The filtering process for a luma sample using short filters as specified in clause 8.8.3.6.6 is invoked with the variables maxFilterLengthP, maxFilterLengthQ, the sample values $p_{i,k}$, $q_{i,k}$ with i=0 . . . maxFilterLengthP and j=0 . . . maxFilterLengthQ, the decision dE, the variables dEp and dEq, and the variable $t_C$ as inputs, and the number of filtered samples nDp and nDq from each side of the block boundary and the filtered sample values $p_i'$ and $q_j'$ as outputs.
  When nDp is greater than 0, the filtered sample values $p_i'$ with i=0 . . . nDp−1 replace the corresponding samples inside the sample array recPicture as follows:

recPicture[xCb+xBl+k][yCb+yBl−i−1]=$p_i'$ (1349)

When nDq is greater than 0, the filtered sample values $q_j'$ with j=0 . . . nDq−1 replace the corresponding samples inside the sample array recPicture as follows:

recPicture[xCb+xBl+k][yCb+yBl+j]=$q_j'$ (1350)

3. When dE is equal to 3, for each sample location (xCb+xBl+k, yCb+yBl), k=0 . . . 3, the following ordered operations apply:
  The filtering process for a luma sample using long filters as specified in clause 8.8.3.6.7 is invoked with the variables maxFilterLengthP, maxFilterLengthQ, the sample values $p_{i,k}$, $q_{i,k}$ with i=0 . . . maxFilterLengthP and j=0 . . . maxFilterLengthQ, and the variable $t_C$ as inputs, and the filtered sample values $p_i'$ and $q_j'$ as outputs.
  The filtered sample values $p_i'$ with i=0 . . . maxFilterLengthP−1 replace the corresponding samples inside the sample array recPicture as follows:

recPicture[xCb+xBl+k][yCb+yBl−i−1]=$p_i'$ (1351)

The filtered sample values with j=0 . . . maxFilterLengthQ−1 replace the corresponding samples inside the sample array recPicture as follows:

recPicture[xCb+xBl+k][yCb+yBl+j]=$q_j'$ (1352)

8.8.3.6.3 Decision Process for Chroma Block Edges

This process is only invoked when ChromaArrayType is not equal to 0.

Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable cIdx specifying the colour component index,
a variable bS specifying the boundary filtering strength,
a variable maxFilterLengthP specifying the maximum filter length,
a variable maxFilterLengthQ specifying the maximum filter length.

Outputs of this process are
the modified filter length variables maxFilterLengthP and maxFilterLengthQ,
the variable $t_C$.

The variable maxK is derived as follows:
  If edgeType is equal to EDGE_VER, the following applies:

max K=(SubHeightC==1)?3:1 (1353)

Otherwise (edgeType is equal to EDGE_HOR), the following applies:

max K=(SubWidthC==1)?3:1 (1354)

The values $p_{i,k}$ and $q_{j,k}$ with i=0 . . . maxFilterLengthP, j=0 . . . maxFilterLengthQ and k=0 . . . maxK are derived as follows:
  If edgeType is equal to EDGE_VER, the following applies:

$q_{j,k}$=recPicture[xCb+xBl+j][yCb+yBl+k] (1355)

$p_{i,k}$=recPicture[xCb+xBl−i−1][yCb+yBl+k] (1356)

subSampleC=SubHeightC (1357)

Otherwise (edgeType is equal to EDGE_HOR), the following applies:

$q_{j,k}$=recPicture[xCb+xBl+k][yCb+yBl+j] (1358)

$p_{i,k}$=recPicture[xCb+xBl+k][yCb+yBl−i−1] (1359)

subSampleC=SubWidthC (1360)

The variable $Qp_P$ is derived as follows:
  The luma location ($xTb_P$, $yTb_P$) is set as the top-left luma sample position of the transform block containing the sample $p_{0,0}$, relative to the top-left luma sample of the picture.
  If TuCResMode[$xTb_P$][$yTb_P$] is equal to 2, $Qp_P$ is set equal to $Qp'_{CbCr}$ of the transform block containing the sample $p_{0,0}$.
  Otherwise, if cIdx is equal to 1, $Qp_P$ is set equal to $Qp'_{Cb}$ of the transform block containing the sample $p_{0,0}$.
  Otherwise, $Qp_P$ is set equal to $Qp'_{Cr}$ of the transform block containing the sample $p_{0,0}$.
The variable $Qp_Q$ is derived as follows:
  The luma location ($xTb_Q$, $yTb_Q$) is set as the top-left luma sample position of the transform block containing the sample $q_{0,0}$, relative to the top-left luma sample of the picture.
  If TuCResMode[$xTb_Q$][$yTb_Q$] is equal to 2, $Qp_Q$ is set equal to $Qp'_{CbCr}$ of the transform block containing the sample $q_{0,0}$.
  Otherwise, if cIdx is equal to 1, $Qp_Q$ is set equal to $Qp'_{Cb}$ of the transform block containing the sample $q_{0,0}$.
  Otherwise, $Qp_Q$ is set equal to $Qp'_{Cr}$ of the transform block containing the sample $q_{0,0}$.
The variable $Qp_C$ is derived as follows:

$Qp_C$=($Qp_Q$−QpBdOffset+$Qp_P$−QpBdOffset+1)>>1 (1361)

The value of the variable 13' is determined as specified in Table 43 based on the quantization parameter Q derived as follows:

sliceBetaOffsetDiv2=
    (cIdx==1?slice_cb_beta_offset_div2:
    slice_cr_beta_offset_div2)

Q=Clip3(0,63,$Qp_C$+(sliceBetaOffsetDiv2<<1)) (1362)

where slice_cb_beta_offset_div2 and slice_cr_beta_offset_div2 are the values of the syntax elements slice_cb_beta_offset_div2 and slice_cr_beta_offset_div2, respectively, for the slice that contains sample $q_{0,0}$.

The variable $\beta$ is derived as follows:

$$\beta = \beta'*(1<<(BitDepth-8)) \qquad (1363)$$

The value of the variable $t_C'$ is determined as specified in Table 43 based on the chroma quantization parameter Q derived as follows:

$$sliceTcOffsetDiv2=(cIdx==1?slice\_cb\_tc\_offset\_div2: slice\_cr\_beta\_offset\_div2)$$

$$Q=Clip3(0,63,Qp_C+(bS-1)+(sliceTcOffsetDiv2<<1)) \qquad (1362)$$

where slice_cb_tc_offset_div2 and slice_cr_beta_offset_div2 are the values of the syntax elements slice_cb_tc_offset_div2 and slice_cr_beta_offset_div2, respectively, for the slice that contains sample $q_{0,0}$.

The variable $t_C$ is derived as follows:

$$t_C=(BitDepth<10)?(t_C'+2)>>(10-BitDepth):t_C'* (1<<(BitDepth-10)) \qquad (1365)$$

When both maxFilterLengthP and maxFilterLengthQ are equal to 1 and bS is not equal to 2, maxFilterLengthP and maxFilterLengthQ are both set equal to 0.

When maxFilterLengthQ is equal to 3, the following ordered operations apply:

1. The variables n1 is derived as follows:

$$n1=subSampleC==2?1:3 \qquad (1366)$$

2. When maxFilterLengthP is equal to 1, the samples $p_{3,0}$ and $p_{2,0}$ are both set equal to $p_{1,0}$ and the samples $p_{3,n1}$, $p_{2,n1}$ are both set equal to $p_{1,n1}$.

3. The variables dpq0, dpq1, dp, dq and d are derived as follows:

$$dp0=Abs(p_{2,0}-2*p_{1,0}+p_{0,0}) \qquad (1367)$$

$$dp1=Abs(p_{2,n1}-2*p_{1,n1}+p_{0,n1}) \qquad (1368)$$

$$dq0=Abs(q_{2,0}-2*q_{1,0}+q_{0,0}) \qquad (1369)$$

$$dq1=Abs(q_{2,n1}-2*q_{1,n1}+q_{0,n1}) \qquad (1370)$$

$$dpq0=dp0+dq0 \qquad (1371)$$

$$dpq1=dp1+dq1 \qquad (1372)$$

$$dp=dp0+dp1 \qquad (1373)$$

$$dq=dq0+dq1 \qquad (1374)$$

$$d=dpq0+dpq1 \qquad (1375)$$

4. The variables dSam0 and dSam1 are both set equal to 0.

5. When d is less than (3, the following ordered operations apply:
   a. The variable dpq is set equal to 2*dpq0.
   b. The variable dSam0 is derived by invoking the decision process for a chroma sample as specified in clause 8.8.3.6.8 for the sample location (xCb+xBl, yCb+yBl) with sample values $p_{0,0}$, $p_{3,0}$, $q_{0,0}$, and $q_{3,0}$, the variables dpq, $\beta$ and $t_C$ as inputs, and the output is assigned to the decision dSam0.
   c. The variable dpq is set equal to 2*dpq1.
   d. The variable dSam1 is modified as follows:
      If edgeType is equal to EDGE_VER, for the sample location (xCb+xBl, yCb+yBl+n1), the decision process for a chroma sample as specified in clause 8.8.3.6.8 is invoked with sample values $p_{0,n1}$, $p_{3,n1}$, $q_{0,n1}$, and $q_{3,n1}$, the variables dpq, $\beta$ and $t_C$ as inputs, and the output is assigned to the decision dSam1.
      Otherwise (edgeType is equal to EDGE_HOR), for the sample location (xCb+xBl+n1, yCb+yBl), the decision process for a chroma sample as specified in clause 8.8.3.6.8 is invoked with sample values $p_{0,n1}$, $p_{3,n1}$, $q_{0,n1}$ and $q_{3,n1}$, the variables dpq, $\beta$ and $t_C$ as inputs, and the output is assigned to the decision dSam1.

6. When dSam0 is equal to 0 or dSam1 is equal to 0, maxFilterLengthP and maxFilterLengthQ are both set equal to 1.

8.8.3.6.4 Filtering Process for Chroma Block Edges

This process is only invoked when ChromaArrayType is not equal to 0.

Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable maxFilterLengthP specifying the maximum filter length,
a variable maxFilterLengthQ specifying the maximum filter length,
the variable $t_C$.

Output of this process is the modified chroma picture sample array recPicture.

The variable maxK is derived as follows:
If edgeType is equal to EDGE_VER, the following applies:

$$max\ K=(SubHeightC==1)?3:1 \qquad (1376)$$

Otherwise (edgeType is equal to EDGE_HOR), the following applies:

$$max\ K=(SubWidthC==1)?3:1 \qquad (1377)$$

The values $p_i$ with i=0 . . . maxFilterLengthP, $q_j$ with j=0 . . . maxFilterLengthQ, and k=0 . . . maxK are derived as follows:
If edgeType is equal to EDGE_VER, the following applies:

$$q_{j,k}=recPicture[xCb+xBl+j][yCb+yBl+k] \qquad (1378)$$

$$p_{i,k}=recPicture[xCb+xBl-i-1][yCb+yBl+k] \qquad (1379)$$

Otherwise (edgeType is equal to EDGE_HOR), the following applies:

$$q_{j,k}=recPicture[xCb+xBl+k][yCb+yBl+j] \qquad (1380)$$

$$p_{i,k}=recPicture[xCb+xBl+k][yCb+yBl-i-1] \qquad (1381)$$

Depending on the value of edgeType, the following applies:
If edgeType is equal to EDGE_VER, for each sample location (xCb+xBl, yCb+yBl+k), k=0 . . . maxK, the following ordered operations apply:
1. The filtering process for a chroma sample as specified in clause 8.8.3.6.9 is invoked with the variables maxFilterLengthP and maxFilterLengthQ, the sample values $p_{i,k}$, $q_{j,k}$ with i=0 . . . maxFilter- LengthP and j=0 . . . maxFilterLengthQ, and the variable $t_C$ as inputs, and the filtered sample values $p_i'$ and $q_j'$ with i=0 . . . maxFilterLengthP−1 and j=0 . . . maxFilterLengthQ−1 as outputs.

2. The filtered sample values $p_i'$ and $q_j'$ with i=0 . . . maxFilterLengthP−1 and j=0 . . . maxFilterLengthQ−1 replace the corresponding samples inside the sample array recPicture as follows:

$$recPicture[xCb+xBl+j][yCb+yBl+k]=q_j' \quad (1382)$$

$$recPicture[xCb+xBl-i-1][yCb+yBl+k]=p_i' \quad (1383)$$

Otherwise (edgeType is equal to EDGE_HOR), for each sample location (xCb+xBl+k, yCb+yBl), k=0 . . . maxK, the following ordered operations apply:

1. The filtering process for a chroma sample as specified in clause 8.8.3.6.9 is invoked with the variable maxFilterLengthP and maxFilterLengthQ, the sample values $p_{i,k}$, $q_{j,k}$ with i=0 . . . maxFilterLengthP and j=0 . . . maxFilterLengthQ, and the variable $t_C$ as inputs, and the filtered sample values $p_i'$ and $q_j'$ with i=0 . . . maxFilterLengthP−1 and j=0 . . . maxFilterLengthQ−1 as outputs.

2. The filtered sample values $p_i'$ and $q_j'$ with i=0 . . . maxFilterLengthP−1 and j=0 . . . maxFilterLengthQ−1 replace the corresponding samples inside the sample array recPicture as follows:

$$recPicture[xCb+xBl+k][yCb+yBl+j]=q_j' \quad (1384)$$

$$recPicture[xCb+xBl+k][yCb+yBl-i-1]=p_i' \quad (1385)$$

8.8.3.6.5 Decision Process for a Luma Sample

Inputs to this process are:
the sample values $p_0$, $p_3$, $q_0$ and $q_3$,
the variables dpq, sp, sq, spq, sidePisLargeBlk, sideQisLargeBlk, β and $t_C$.

Output of this process is the variable dSam containing a decision.

The variables sp and sq are modified as follows:
When sidePisLargeBlk is equal to 1, the following applies:

$$sp=(sp+Abs(p_3-p_0)+1)>>1 \quad (1386)$$

When sideQisLargeBlk is equal to 1, the following applies:

$$sq=(sq+Abs(q_3-q_0)+1)>>1 \quad (1387)$$

The variables sThr1 and sThr2 are is derived as follows:
If sidePisLargeBlk is equal to 1 or sideQisLargeBlk is equal to 1, the following applies:

$$sThr1=3*\beta>>5 \quad (1388)$$

$$sThr2=\beta>>4 \quad (1389)$$

Otherwise, the following applies:

$$sThr1=\beta>>3 \quad (1390)$$

$$sThr2=\beta>>2 \quad (1391)$$

The variable dSam is specified as follows:
If all of the following conditions are true, dSam is set equal to 1:
dpq is less than sThr2,
sp+sq is less than sThr1,
spq is less than $(5*t_C+1)>>1$.
Otherwise, dSam is set equal to 0.

8.8.3.6.6 Filtering Process for a Luma Sample Using Short Filters

Inputs to this process are:
the variables maxFilterLengthP and maxFilterLengthQ,
the sample values $p_i$ and $q_j$ with i=0 . . . maxFilterLengthP and j=0 . . . maxFilterLengthQ,
a variable dE,
the variables dEp and dEq containing decisions to filter samples $p_1$ and $q_1$, respectively,
a variable $t_C$.
Outputs of this process are:
the number of filtered samples nDp and nDq,
the filtered sample values $p_i'$ and $q_j'$ with i=0 . . . nDp−1, j=0 . . . nDq−1.
Depending on the value of dE, the following applies:
If the variable dE is equal to 2, nDp and nDq are both set equal to 3 and the following strong filtering applies:

$$p_0'=Clip3(p_0-3*t_C,p_0+3*t_C,(p_2+2*p_1+2*p_0+2*q_0++4)>>3) \quad (1392)$$

$$p_1'=Clip3(-2*t_C,p_1+2*t_C,(p_2+p_1+p_0+q_0+2)>>2) \quad (1993)$$

$$p_2'=Clip3(p_2-1*t_C,p_2+1*t_C,(2*p_3+3*p_2+p_1+p_0+q_0+4)>>3) \quad (1394)$$

$$q_0'=Clip3(q_0-3*t_C,q_0+3*t_C,(p_1+2*p_0+2*q_0+2*+q_2+4)>>3) \quad (1395)$$

$$q_1'=Clip3(q_1-2*t_C,q_1+2*t_C,(p_0+q_0+q_1+q_2+2)>>2) \quad (1396)$$

$$q_2'=Clip3(q_2-1*t_C,q_2+1*t_C,(p_0+q_0+q_1+3*q_2+2*q_3+4)>>3) \quad (1397)$$

Otherwise, nDp and nDq are set both equal to 0 and the following weak filtering applies:
The following applies:

$$\Delta=(9*(q_0-p_0)-3*(q_1-p_1)+8)>>4 \quad (1398)$$

When Abs(Δ) is less than $t_C*10$, the following ordered operations apply:
The filtered sample values $p_0'$ and $q_0'$ are specified as follows:

$$\Delta=Clip3(-t_C,t_C,\Delta) \quad (1399)$$

$$p_0'=Clip1(p_0+\Delta) \quad (1400)$$

$$q_0'=Clip1(q_0-\Delta) \quad (1401)$$

When dEp is equal to 1, the filtered sample value $p_i'$ is specified as follows:

$$\Delta p=Clip3(-(t_C>>1),t_C>>1,(((p_2+p_0+1)>>1)-p_1+\Delta)>>1) \quad (1402)$$

$$p_1'=Clip1(p_1+\Delta p) \quad (1403)$$

When dEq is equal to 1, the filtered sample value $q_1'$ is specified as follows:

$$\Delta q=Clip3(-(t_C>>1),t_C>>1,(((q_2+q_0+1)>>1)-q_1-\Delta)>>1) \quad (1404)$$

$$q_1'=Clip1(q_1+\Delta q) \quad (1405)$$

nDp is set equal to dEp+1 and nDq is set equal to dEq+1.

When nDp is greater than 0 and pred_mode_plt_flag of the coding unit that includes the coding block containing the sample $p_0$ is equal to 1, nDp is set equal to 0
When nDq is greater than 0 and pred_mode_plt_flag of the coding unit that includes the coding block containing the sample $q_0$ is equal to 1, nDq is set equal to 0:

8.8.3.6.7 Filtering Process for a Luma Sample Using Long Filters

Inputs to this process are:
the variables maxFilterLengthP and maxFilterLengthQ,
the sample values $p_i$ and $q_j$ with i=0 . . . maxFilterLengthP and j=0 . . . maxFilterLengthQ,
a variable $t_C$.

Outputs of this process are:
the filtered sample values $p_i'$ and $q_j'$ with i=0 . . . maxFilterLengthP−1, j=0 . . . maxFilterLengthQ−1.

The variable refMiddle is derived as follows:
If maxFilterLengthP is equal to maxFilterLengthQ and maxFilterLengthP is equal to 5, the following applies:

$$\text{refMiddle}=(p_4+p_3+2*(p_2+p_1+p_0+q_0+q_1+q_2)+q_3+q_4+8)>>4 \quad (1406)$$

Otherwise, if maxFilterLengthP is equal to maxFilterLengthQ and maxFilterLengthP is not equal to 5, the following applies:

$$\text{refMiddle}=(p_6+p_5+p_4+p_3+p_2+p_1+2*(p_0+q_0)+q_1+q_2+q_3+q_4+q_5+q_6+8)>>4 \quad (1407)$$

Otherwise, if one of the following conditions are true,
maxFilterLengthQ is equal to 7 and maxFilterLengthP is equal to 5,
maxFilterLengthQ is equal to 5 and maxFilterLengthP is equal to 7,
the following applies:

$$\text{refMiddle}=(p_5+p_4+p_3+p_2+2*(p_1+p_0+q_0+q_1)+q_2+q_3+q_4+q_5+8)>>4 \quad (1408)$$

Otherwise, if one of the following conditions are true,
maxFilterLengthQ is equal to 5 and maxFilterLengthP is equal to 3,
maxFilterLengthQ is equal to 3 and maxFilterLengthP is equal to 5,
the following applies:

$$\text{refMiddle}=(p_3+p_2+p_1+p_0+q_0+q_1+q_2+q_3+4)>>3 \quad (1409)$$

Otherwise, if maxFilterLengthQ is equal to 7 and maxFilterLengthP is equal to 3, the following applies:

$$\text{refMiddle}=(2*(p_2+p_1+p_0+q_0)+p_0+p_1+q_1+q_2+q_3+q_4+q_5+q_6+8)>>4 \quad (1410)$$

Otherwise, the following applies:

$$\text{refMiddle}=(p_6+p_5+p_4+p_3+p_2+p_1+2*(q_2+q_1+q_0+p_0)+q_0+q_1+8)>>4 \quad (1411)$$

The variables refP and refQ are derived as follows:

$$\text{ref}P=(p_{maxFilterLengthP}+p_{maxFilterLengthP-1}+1)>>1 \quad (1412)$$

$$\text{ref}Q=(q_{maxFilterLengthQ}+q_{maxFilterLengthQ-1}+1)>>1 \quad (1413)$$

The variables $f_i$ and $t_CPD_i$ are defined as follows:
If maxFilterLengthP is equal to 7, the following applies:

$$f_{0\ldots 6}=\{59,50,41,32,23,14,5\} \quad (1414)$$

$$t_CPD_{0\ldots 6}=\{6,5,4,3,2,1,1\} \quad (1415)$$

Otherwise, if maxFilterLengthP is equal to 5, the following applies:

$$f_{0\ldots 4}=\{58,45,32,19,6\} \quad (1416)$$

$$t_CPD_{0\ldots 4}=\{6,5,4,3,2\} \quad (1417)$$

Otherwise, the following applies:

$$f_{0\ldots 2}=\{53,32,11\} \quad (1418)$$

$$t_CPD_{0\ldots 2}=\{6,4,2\} \quad (1419)$$

The variables $g_j$ and $t_CQD_j$ are defined as follows:
If maxFilterLengthQ is equal to 7, the following applies:

$$g_{0\ldots 6}=\{59,50,41,32,23,14,5\} \quad (1420)$$

$$t_CQD_{0\ldots 6}=\{6,5,4,3,2,1,1\} \quad (1421)$$

Otherwise, if maxFilterLengthQ is equal to 5, the following applies:

$$g_{0\ldots 4}=\{58,45,32,19,6\} \quad (1422)$$

$$t_CQD_{0\ldots 4}=\{6,5,4,3,2\} \quad (1423)$$

Otherwise, the following applies:

$$g_{0\ldots 2}=\{53,32,11\} \quad (1424)$$

$$t_CQD_{0\ldots 2}=\{6,4,2\} \quad (1425)$$

The filtered sample values $p_i'$ and $q_j'$ with i=0 . . . maxFilterLengthP−1 and j=0 . . . maxFilterLengthQ−1 are derived as follows:

$$p_i'=\text{Clip3}(p_i-(t_C*t_CPD_i)>>1,p_i+(t_C*t_CPD_i)>>1,(\text{refMiddle}*f_i+\text{ref}P*(64-f_i)+32)>>6) \quad (1426)$$

$$q_j'=\text{Clip3}(q_j-(t_C*t_CQD_j)>>1,q_j+(t_C*t_CQD_j)>>1,(\text{refMiddle}*g_j+\text{ref}Q*(64-g_j)+32)>>6) \quad (1427)$$

When pred_mode_plt_flag of the coding unit that includes the coding block containing the sample $p_i$ is equal to 1, the filtered sample value, $p_i'$ is substituted by the corresponding input sample value $p_i$ with i=0 . . . maxFilterLengthP−1.

When pred_mode_plt_flag of the coding unit that includes the coding block containing the sample $q_i$ is equal to 1, the filtered sample value, $q_i'$ is substituted by the corresponding input sample value $q_j$ with j=0 . . . maxFilterLengthQ−1.

8.8.3.6.8 Decision Process for a Chroma Sample

Inputs to this process are:
the sample values $p_0$, $p_3$, $q_0$ and $q_3$,
the variables dpq, β and $t_C$.

Output of this process is the variable dSam containing a decision.

The variable dSam is specified as follows:
If all of the following conditions are true, dSam is set equal to 1:
dpq is less than ((3>>2),
$\text{Abs}(p_3-p_0)+\text{Abs}(q_0-q_3)$ is less than ((3>>3),
$\text{Abs}(p_0-q_0)$ is less than $(5*t_C+1)>>1$.
Otherwise, dSam is set equal to 0.

8.8.3.6.9 Filtering Process for a Chroma Sample

This process is only invoked when ChromaArrayType is not equal to 0.

Inputs to this process are:
the variables maxFilterLengthP and maxFilterLengthQ,
the chroma sample values $p_i$ and $q_j$ with i=0 . . . maxFilterLengthP−1 and j=0 . . . maxFilterLengthQ−1,
a variable $t_C$.

Outputs of this process are the filtered sample values $p_i'$ and $q_j'$ with i=0 . . . maxFilterLengthP−1 and j=0 . . . maxFilterLengthQ−1.

The filtered sample values $p_i'$ and $q_j'$ with i=0 . . . maxFilterLengthP−1 and j=0 . . . maxFilterLengthQ−1 are derived as follows:
If both of maxFilterLengthP and maxFilterLengthQ is equal to 3, the following strong filtering applies:

$$p_0'=\text{Clip3}(p_0-t_C,p_0+t_C,(p_3+p_2+p_1+2*p_0+q_0+q_1+q_2+4)>>3) \quad (1428)$$

$$p_1'=\text{Clip3}(p_1-t_C,p_1+t_C,(2*p_3+p_2+2*p_1+p_0+q_0+q_1+4)>>3) \quad (1429)$$

$$p_2'=\text{Clip3}(p_2-t_C, p_2+t_C, (3*p_3+2*p_2+p_1+p_0+q_0+4)>>3) \quad (1430)$$

$$q_0'=\text{Clip3}(q_0-t_C, q_0+t_C, (p_2+p_1+p_0+2*q_0+q_1+q_2+q_3+4)>>3) \quad (1431)$$

$$q_1'=\text{Clip3}(-t_C, +t_C, (p_1+p_0+q_0+2*+q_2+2*q_3+4)>>3) \quad (1432)$$

$$q_2'=\text{Clip3}(q_2-t_C, q_2+t_C, (p_0+q_0+q_1+2*q_2+3*q_3+4)>>3) \quad (1433)$$

Otherwise, if the variable maxFilterLengthP is equal to 1 and maxFilterLengthQ is equal to 3, the following filtering applies:

$$p_0'=\text{Clip3}(p_0-t_C, p_0+t_C, (3*p_1+2*p_0+q_0+q_1+q_{2+4})>>3) \quad (1434)$$

$$q_0'=\text{Clip3}(q_0-t_C, q_0+t_C, (2*p_1+p_0+2*q_0+q_1+q_2+q_3+4)>>3) \quad (1435)$$

$$q_1'=\text{Clip3}(q_1-t_C, q_1+t_C, (p_1+p_0+q_0+2*q_1+q_2+2*q_3+4)>>3) \quad (1436)$$

$$q_2'=\text{Clip3}(q_2-t_C, q_2+t_C, (p_0+q_0+q_1+2*q_2+3*q_3+4)>>3) \quad (1437)$$

Otherwise, the following weak filtering applies:

$$\Delta=\text{Clip3}(-t_C, t_C, ((((q_0-p_0)<<2)+p_1-q_1+4)>>3)) \quad (1438)$$

$$p_0'=\text{Clip1}(p_0+\Delta) \quad (1439)$$

$$q_0'=\text{Clip1}(q_0-\Delta) \quad (1440)$$

When pred_mode_plt_flag of the coding unit that includes the coding block containing the sample $p_1$ is equal to 1, the filtered sample value, $p_1'$ is substituted by the corresponding input sample value $p_i$ with i=0 . . . maxFilterLengthP−1.

When pred_mode_plt_flag of the coding unit that includes the coding block containing the sample $q_1$ is equal to 1, the filtered sample value, $q_1'$ is substituted by the corresponding input sample value $q_i$ with i=0 . . . maxFilterLengthQ−1.

Currently the signaling of the Cb and Cr deblocking control parameters is performed even if the color format of the encoded sequence is 4:0:0, e.g. when a value of ChromaArrayType is equal to 0. When the input sequence has no color component, there is no further requirement to perform deblocking for the color components.

In some cases, the deblocking control parameters may be the same across the Luma and both the Chroma components in typical cases.

For the blocks which are coded using Joint Cb-Cr mechanism, might exhibit different quantization error characteristics and therefore may benefit from having separate deblocking control parameters (Beta and Tc offsets) signalled.

Embodiment 1

In this embodiment, the Cb and Cr deblocking Beta and Tc offsets (for simplicity we further call them as deblocking control parameters in this application) are (only) signalled when a value of the ChromaArrayType is not equal to 0.

The syntax for this embodiment is showed as follows:
Picture Parameter Set (PPS) Syntax:

| | |
|---|---|
| ...... | |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_ flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblockin_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     if( ChromaArrayType != 0 ) { | |
|       pps_cb_beta_offset_div2 | se(v) |
|       pps_cb_tc_off_set_div2 | se(v) |
|       pps_cr_beta_off_set_div2 | se(v) |
|       pps_cr_tc_offset_div2 | se(v) |
|     } | |
|   } | |
| } | |
| ...... | u(1) |
| if( deblocking_filter_override_enabled_flag ) | |
|   dbf_info_in_ph_flag | u(1) |
| ...... | |

Or
Picture Header (PH) Syntax:

| | |
|---|---|
| if( deblocking_filter_override_enabled_flag && dbf_info_in_ph_flag ) { | |
|   ph_deblocking_filter override_flag | u(1) |
|   if( ph_deblocking_filter_override_flag ) { | |
|     ph_deblocking_filter disabled_flag | u(1) |
|     if( !ph_deblocking_filter_disabled_flag ) { | |
|       ph_beta_offset_div2 | se(v) |
|       ph_tc_offset_div2 | se(v) |
|       if( ChromaArrayType != 0 ) { | |
|         ph_cb_beta_offset_div2 | se(v) |
|         ph_cb_tc_off_set_div2 | se(v) |
|         ph_cr_beta_offset_div2 | se(v) |
|         ph_cr_tc_offset_div2 | se(v) |
|       } | |
|     } | |
|   } | |
| } | |

Or
Slice Header Syntax:

| | |
|---|---|
| if(deblocking_filter_override_enabled flag && !dbf_info_in_ph_flag ) | |
|   slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       if( ChromaArrayType != 0 ) { | |
|         slice_cb_beta_offset_div2 | se(v) |
|         slice_cb_tc_off_set_div2 | se(v) |

| | |
|---|---|
| slice_cr_beta_offset_div2 | se(v) |
| slice_cr_tc_offset_div2 | se(v) |
| } | |
| } | |
| } | |
| } | |

In some examples, a value of the ChromaArrayType may be not obtained at the PPS syntax level, as ChromaArrayType is signalled in the Sequence Parameter set level (SPS). A conditional signaling based on the ChromaArrayType in the PPS might create a parsing dependency between SPS and PPS. Therefore one alternative solution is to move the existing deblocking control parameters from PPS to SPS level. In this way the parsing dependency between SPS and PPS is avoided.

Alternatively, the deblocking control parameters can be conditionally signalled based on the already existing syntax element called pps_chroma_tool_offsets_present_flag.

The modified syntax of PPS is shown below:

Picture Parameter Set (PPS) Syntax:

| | |
|---|---|
| ...... | |
| pps_chroma_tool_offsets_present_flag | u(1) |
| if( pps_chroma_tool_offsets_present_flag ) { | |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
| pps_joint_cbcr_qp_offset_value | se(v) |
| pps_slice_chroma_qp_offsets_present_flag | u(1) |
| pps_cu_chroma_qp_offset_list_enabled_flag | u(1) |
| } | |
| if( pps_cu_chroma_qp_offset_list_enabled_flag ) { | |
| chroma_qp_offset_list_len_minus1 | ue(v) |
| for( i = 0; i <= chroma_qp_offset_list_len_minus1; i++ ) { | |
| cb_qp_offset_list[ i ] | se(v) |
| cr_qp_offset_list[ i ] | se(v) |
| if( pps_joint_cbcr_qp_offset_present_flag ) | |
| joint_cbcr_qp_offset_list[ i ] | se(v) |
| } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
| deblockin_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| if( pps_chroma_tool_offsets_present_flag ) { | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |

| | |
|---|---|
| } | |
| ....... | u(1) |
| if( deblocking_filter_override_enabled_flag ) | |
| dbf_info_in_ph_flag | u(1) |
| ...... | |

The above solution has the advantage that it does not create any parsing dependency between SPS and PPS, and signals the deblocking control parameters for Cb and Cr components (only) when the value of the ChromaArrayType is not equal to 0.

Another alternative solution would be to not conditionally signal the deblocking control parameter at the PPS level (based on the ChromaArrayType), but to signal them conditionally at PH and SH level (based on the ChromaArrayType).

In this embodiment, the definition of these syntaxes in the table can refer to the above descriptions.

Embodiment 2

In this embodiment, a new syntax element is signaled. This syntax is used to indicate whether the Luma and Chroma deblocking control parameters are the same or not. When the values of the Luma and Chroma deblocking control parameters are different, the Cb and Cr deblocking control parameters are further signalled. This embodiment removes the redundant signaling when the deblocking parameters are the same across Luma and Chroma components.

The syntax and semantics for this embodiment are as shown below:

Picture Parameter Set (PPS) Syntax:

| | |
|---|---|
| ...... | |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_chroma_offsets_same_as_luma | u(1) |
| if(!pps_chroma_offsets_same_as_luma ) { | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| } | |
| ....... | u(1) |
| if( deblocking_filter_override_enabled_flag ) | |
| dbf_info_in_ph_flag | u(1) |
| ... | |

Or Picture Header (PH) Syntax:

| | |
|---|---|
| if( deblocking_filter_override_enabled_flag && dbf_info_in_ph_flag ) { | |
| ph_deblocking_filter override_flag | u(1) |
| if( ph_deblocking_filter_override_flag ) { | |
| ph_deblocking_filter_disabled_flag | u(1) |
| if( !ph_deblocking_ | |

-continued

```
        filter_disabled_flag ) {
            ph_beta_offset_div2                          se(v)
            ph_tc_offset_div2                            se(v)
                ph_chroma_offsets_same_as_luma           u(1)
                if(!ph_chroma_
                offsets_same_as_luma ) {
                    ph_cb_beta_offset_div2               se(v)
                    ph_cb_tc_offset_div2                 se(v)
                    ph_cr_beta_offset_div2               se(v)
                    ph_cr_tc_offset_div2                 se(v)
                }
        }
    }
}
```

Or Slice Header (SH) Syntax:

```
if( deblocking_filter_override_
enabled_flag && !dbf_info_in_ph_flag )
    slice_deblocking_filter_override_flag               u(1)
if( slice_deblocking_
filter_override_flag ) {
    slice_deblocking_filter_disabled_flag               u(1)
    if( !slice_deblocking_
    filter_disabled_flag ) {
        slice_beta_offset_div2                          se(v)
        slice_tc_offset_div2                            se(v)
            slice_chroma_offsets_same_as_luma           u(1)
            if( !slice_chroma_
            offsets_same_as_luma ) {
            slice_cb_beta_offset_div2                   se(v)
            slice_cb_tc_offset_div2                     se(v)
            slice_cr_beta_offset_div2                   se(v)
            slice_cr_tc_offset_div2                     se(v)
            }
    }
}
```

The semantics of the newly introduced syntax elements are as follows:

slice_chroma_offsets_same_as_luma equal to 0 specifies that the syntax elements slice_cb_beta_offset_div2, slice_cb_tc_offset_div2, slice_cr_beta_offset_div2 and slice_cr_tc_offset_div2 are further signalled in the slice header.

slice_chroma_offsets_same_as_luma equal to 1 specifies that the values of syntax elements slice_cb_beta_offset_div2, slice_cb_tc_offset_div2, slice_cr_beta_offset_div2 and slice_cr_tc_offset_div2 are not further signalled and are inferred to be the same as slice_beta_offset_div2 and slice_tc_offset_div2 respectively.

ph_chroma_offsets_same_as_luma equal to 0 specifies that the the syntax elements ph_cb_beta_offset_div2, ph_cb_tc_offset_div2, ph_cr_beta_offset_div2 and ph_cr_tc_offset_div2 are further signalled in the picture header.

ph_chroma_offsets_same_as_luma equal to 1 specifies that the values of syntax elements ph_cb_beta_offset_div2, ph_cb_tc_offset_div2, ph_cr_beta_offset_div2 and ph_cr_tc_offset_div2 are not signalled are further inferred to be the same as ph_beta_offset_div2 and ph_tc_offset_div2 respectively.

pps_chroma_offsets_same_as_luma equal to 0 specifies that the syntax elements pps_cb_beta_offset_div2, pps_cb_tc_offset_div2, pps_cr_beta_offset_div2 and pps_cr_tc_offset_div2 are further signalled in the PPS. pps_chroma_offsets_same_as_luma equal to 1 specifies that the values of syntax elements pps_cb_beta_offset_div2, pps_cb_tc_offset_div2, pps_cr_beta_offset_div2 and pps_cr_tc_offset_div2 are not signalled and are further inferred to be the same as pps_beta_offset_div2 and pps_tc_offset_div2 respectively.

The definition of other syntaxes in the table can refer to the above descriptions.

Embodiment 3

In this embodiment, separate beta and tc offset parameters are introduced for joint cb-cr coded blocks.

The syntax is as follows:

Picture Parameter Set Syntax (PPS) Syntax:

```
......
if( deblocking_filter_
control_present_flag ) {
    deblocking_filter_override_enabled_flag             u(1)
    pps_deblocking_filter_disabled_flag                 u(1)
    if( !pps_deblocking_
    filter_disabled_flag ) {
        pps_beta_offset_div2                            se(v)
        pps_tc_offset_div2                              se(v)
        pps_cb_beta_offset_div2                         se(v)
        pps_cb_tc_offset_div2                           se(v)
        pps_cr_beta_offset_div2                         se(v)
        pps_cr_tc_offset_div2                           se(v)
        pps_cbcr_beta_offset_div2                       se(v)
        pps_cbcr_tc_offset_div2                         se(v)
    }
}
 ......                                                 u(1)
if( deblocking_filter_
override_enabled_flag )
    dbf_info_in_ph_flag                                 u(1)
......
```

Picture Header (PH) Syntax:

```
if( deblocking_filter_override_enabled_
flag && dbf_info_in_ph_flag ) {
    ph_deblocking_filter_override_flag                  u(1)
    if( ph_deblocking_filter_override_flag ) {
        ph_deblocking_filter_disabled_flag              u(1)
        if( !ph_deblocking_filter_
        disabled_flag ) {
            ph_beta_offset_div2                         se(v)
            ph_tc_offset_div2                           se(v)
            ph_cb_beta_offset_div2                      se(v)
            ph_cb_tc_offset_div2                        se(v)
            ph_cr_beta_offset_div2                      se(v)
            ph_cr_tc_offset_div2                        se(v)
            ph_cbcr_beta_offset_div2                    se(v)
            ph_cbcr_tc_offset_div2                      se(v)
        }
    }
}
```

Slice Header (SH) Syntax:

```
if( deblocking_filter_override_
enabled_flag && !dbf_info_in_ph_flag )
    slice_deblocking_filter_override_flag               u(1)
if( slice_deblocking_filter_override_flag ) {
    slice_deblocking_filter_disabled_flag               u(1)
    if( !slice_deblocking_
    filter_disabled_flag ) {
        slice_beta_offset_div2                          se(v)
        slice_tc_offset_div2                            se(v)
        slice_cb_beta_offset_div2                       se(v)
        slice_cb_tc_offset_div2                         se(v)
```

-continued

| | |
|---|---|
| slice_cr_beta_offset_div2 | se(v) |
| slice_cr_tc_offset_div2 | se(v) |
| slice_cbcr_beta_offset_div2 | se(v) |
| slice_cbcr_tc_offset_div2 | se(v) |
| } | |
| } | |

The semantics of the newly introduced syntax elements are as follows:

pps_cbcr_beta_offset_div2 and pps_cbcr_tc_offset_div2 specify the default deblocking parameter offsets for β and tC (divided by 2) that are applied to the Joint Cb-Cr component for slices referring to the PPS, unless the default deblocking parameter offsets are overridden by the deblocking parameter offsets present in the picture headers or the slice headers of the slices referring to the PPS. The values of pps_cbcr_beta_offset_div2 and pps_cbcr_tc_offset_div2 shall both be in the range of −12 to 12, inclusive. When not present, the values of pps_cbcr_beta_offset_div2 and pps_cbcr_tc_offset_div2 are both inferred to be equal to 0.

ph_cbcr_beta_offset_div2 and ph_cbcr_tc_offset_div2 specify the deblocking parameter offsets for β and tC (divided by 2) that are applied to the Joint Cb-Cr component for the slices associated with the PH. The values of ph_cbcr_beta_offset_div2 and ph_cbcr_tc_offset_div2 shall both be in the range of −12 to 12, inclusive. When not present, the values of ph_cbcr_beta_offset_div2 and ph_cbcr_tc_offset_div2 are inferred to be equal to pps_cbcr_beta_offset_div2 and pps_cbcr_tc_offset_div2, slice_cbcr_beta_offset_div2 and slice_cbcr_tc_offset_div2 specify the deblocking parameter offsets for β and tC (divided by 2) that are applied to the Joint Cb-Cr component for the current slice. The values of slice_cbcr_beta_offset_div2 and slice_cbcr_tc_offset_div2 shall both be in the range of −12 to 12, inclusive. When not present, the values of slice_cbcr_beta_offset_div2 and slice_cbcr_tc_offset_div2 are inferred to be equal to ph_cbcr_beta_offset_div2 and ph_cbcr_tc_offset_div2, respectively.

The required changes in the derivation of QP value for Chroma deblocking is as follows: The value of the variable β' is determined as specified in Table 43 based on the quantization parameter Q derived as follows:

$$\text{sliceBetaOffsetDiv2} = ((\text{TuCResMode}[xTb_Q][yTb_Q]==2) \| (\text{TuCResMode}[xTb_P][yTb_P]==2) ? \text{slice\_cbcr\_beta\_offset\_div2} : (\text{cIdx}==1 ? \text{slice\_cb\_beta\_offset\_div2} : \text{slice\_cr\_beta\_offset\_div2}))$$

$$Q = \text{Clip3}(0, 63, Qp_C + (\text{sliceBetaOffsetDiv2} << 1)) \quad (1355)$$

where slice_cb_beta_offset_div2, slice_cr_beta_offset_div2 and slice_cbcr_beta_offset_div2 are the values of the syntax elements slice_cb_beta_offset_div2, slice_cr_beta_offset_div2 and slice_cbcr_beta_offset_div2, respectively, for the slice that contains sample $q_{0,0}$ The value of the variable $t_c'$ is determined as specified in Table 43 based on the chroma quantization parameter Q derived as follows:

$$\text{sliceTcOffsetDiv2} = ((\text{TuCResMode}[xTb_Q][yTb_Q] \| \text{TuCResMode}[xTb_P][yTb_P]==2) ? \text{slice\_cbcr\_tc\_offset\_div2} : (\text{cIdx}==1 ? \text{slice\_cb\_tc\_offset\_div2} : \text{slice\_cr\_tc\_offset\_div2}))$$

$$Q = \text{Clip3}(0, 65, Qp_C + 2*(bS-1) + (\text{sliceTcOffsetDiv2} << 1)) \quad (1357)$$

where slice_cb_tc_offset_div2, slice_cr_beta_offset_div2 and slice_cr_tc_offset_div2 are the values of the syntax elements slice_cb_tc_offset_div2, slice_cr_tc_offset_div2 and slice_cbcr_tc_offset_div2, respectively, for the slice that contains sample $q_{00}$.

The definition of other syntaxes in the table can refer to the above descriptions.

Figure 8:
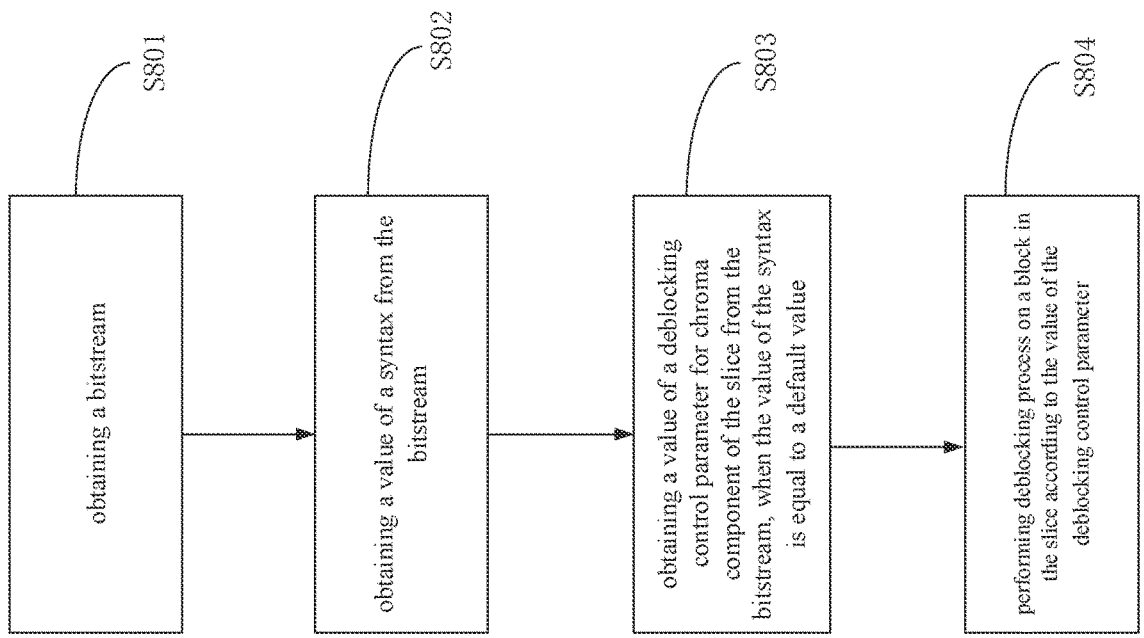
FIG. 8 is a flowchart showing a method according to an embodiment.
Figure 9:
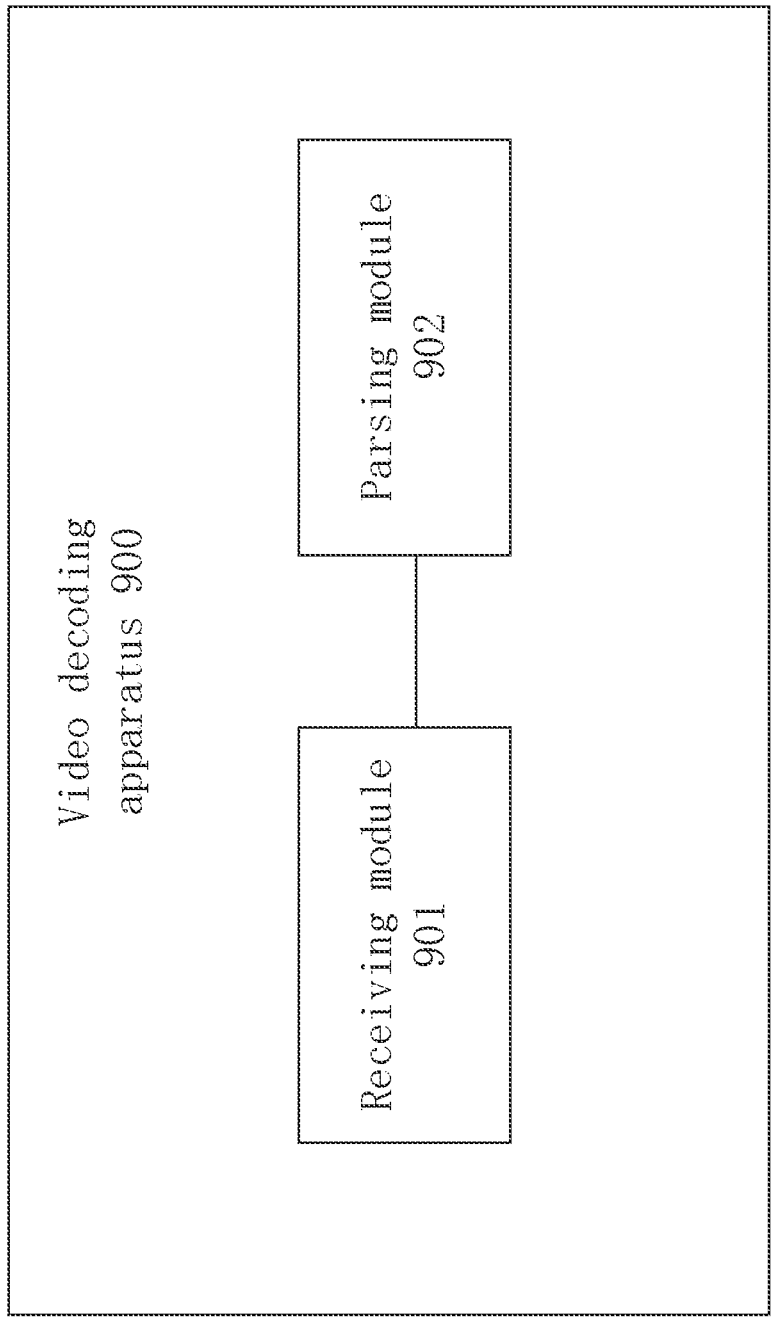
FIG. 9 is a block diagram showing an apparatus according to an embodiment.

In an implementation as shown in FIG. 8, a method of coding implemented by a decoding device is disclosed, the method comprising:

S801: obtaining a bitstream.

The bitstream may be obtained according to wireless network or wired network. The bitstream may be transmitted from a website, server, or other remote source using a coaxial cable, fiber optic cable, twisted pair, digital subscriber line (DSL), or wireless technologies such as infrared, radio, microwave, WIFI, Bluetooth, LTE or 5G.

In an embodiment, a bitstream are a sequence of bits, in the form of a network abstraction layer (NAL) unit stream or a byte stream, that forms the representation of a sequence of access units (AUs) forming one or more coded video sequences (CVSs).

In some embodiments, for a decoding process, decoder side reads a bitstream and derives decoded pictures from the bitstream; for an encoding process, encoder side produces a bitstream.

Normally, a bitstream will comprise syntax elements that are formed by a syntax structure. syntax element: An element of data represented in the bitstream.

syntax structure: Zero or more syntax elements present together in the bitstream in a specified order.

In an embodiment, bitstream formats specifies the relationship between the network abstraction layer (NAL) unit stream and byte stream, either of which are referred to as the bitstream.

The bitstream can be in one of two formats: the NAL unit stream format or the byte stream format. The NAL unit stream format is conceptually the more "basic" type. The NAL unit stream format comprises a sequence of syntax structures called NAL units. This sequence is ordered in decoding order. There are constraints imposed on the decoding order (and contents) of the NAL units in the NAL unit stream.

The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes.

This clause specifies the relationship between source and decoded pictures that is given via the bitstream.

The video source that is represented by the bitstream is a sequence of pictures in decoding order.

The source and decoded pictures are each comprised of one or more sample arrays:

Luma (Y) only (monochrome).

Luma and two chroma (YCbCr or YCgCo).

Green, blue, and red (GBR, also known as RGB).

Arrays representing other unspecified monochrome or tri-stimulus colour samplings (for example, YZX, also known as XYZ).

The variables and terms associated with these arrays are referred to as luma (or L or Y) and chroma, where the two chroma arrays are referred to as Cb and Cr; regardless of the actual colour representation method in use. The actual colour representation method in use can be indicated in syntax that is specified in VUI parameters as specified in ITU-T H.SEI|ISO/IEC 23002-7.

S802: obtaining a value of a syntax element from the bitstream.

In an implementation, the value of the syntax element is related to a deblocking control parameter for a chroma component of a slice of a coded picture. For example, the value of the syntax element indicates whether chroma tool offsets related syntax elements are present in a picture parameter set, PPS, raw byte sequence payload, RBSP, structure or not.

In an example, the syntax is represents according to pps_chroma_tool_offsets_present_flag. pps_chroma_tool_offsets_present_flag equal to 1 specifies that chroma tool offsets related syntax elements are present in the PPS RBSP syntax structure and the chroma deblocking tc and β offset syntax elements could be present in the PH syntax structures or the SHs of pictures referring to the PPS. pps_chroma_tool_offsets_present_flag equal to 0 specifies that chroma tool offsets related syntax elements are not present in the PPS RBSP syntax structure and the chroma deblocking tc and β offset syntax elements are not present in the PH syntax structures or the SHs of pictures referring to the PPS. When sps_chroma_format_idc is equal to 0, the value of pps_chroma_tool_offsets_present_flag shall be equal to 0.

In an example, the value of the syntax element is obtained in the PPS.

In an example, when there is no color component in a video sequence, the value of the syntax element is equal to 0.

In an example, the value of the syntax is used to determine whether a deblocking control parameter for luma component of the coding block is same as the deblocking control parameter for chroma component of the block.

S803: obtaining a value of a deblocking control parameter for chroma component of the slice from the bitstream, when the value of the syntax element is equal to a preset value.

The preset value is an integer value. In an example, the preset value is not equal to 0. In an example, the preset value is equal to 1.

In an example, the value of the deblocking control parameter for chroma component of the coding block is obtained in the PPS.

In an example, the value of the deblocking control parameter for chroma component of the slice is obtained in a picture header, PH.

In an example, the value of the deblocking control parameter for chroma component of the slice is obtained in a slice header, SH.

In an example, the deblocking control parameter for chroma component of the slice is signaled when the video sequence has a color component.

In an example, at PPS level, a deblocking control parameter for chroma component of the slice is represented according to pps_cb_beta_offset_div2, pps_cb_tc_offset_div2, pps_cr_beta_offset_div2 or pps_cr_tc_offset_div2.

It could be understood that, in some implementations, there is only one deblocking control parameter for chroma component or any combination of these deblocking control parameters. For example, all these four deblocking control parameters are conditionally signaled according to the value of pps_chroma_tool_offsets_present_flag.

```
if( pps_chroma_tool_
    offsets_present_flag ) {
        pps_cb_beta_offset_div2        se(v)
        pps_cb_tc_offset_div2          se(v)
        pps_cr_beta_offset_div2        se(v)
        pps_cr_tc_offset_div2          se(v)
}
``` pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are inferred to be equal to pps_luma_beta_offset_div2 and pps_luma_tc_offset_div2, respectively.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are inferred to be equal to pps_luma_beta_offset_div2 and pps_luma_tc_offset_div2, respectively.

pps_luma_beta_offset_div2 and pps_luma_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_luma_beta_offset_div2 and pps_luma_tc_offset_div2 shall both be in the range of −12 to 12, inclusive. When not present, the values of pps_luma_beta_offset_div2 and pps_luma_tc_offset_div2 are both inferred to be equal to 0.

In an example, at PH level, a deblocking control parameter for chroma component of the slice is represented according to ph_cb_beta_offset_div2, ph_cb_tc_offset_div2, ph_cr_beta_offset_div2 or ph_cr_tc_offset_div2. It could be understood that, in some implementations, there is only one deblocking control parameter for chroma component or any combination of these deblocking control parameters. For example, all these four deblocking control parameters are conditionally signaled according to the value of pps_chroma_tool_offsets_present_flag.

```
if( pps_chroma_tool_
    offsets_present_flag ) {
        ph_cb_beta_offset_div2         se(v)
        ph_cb_tc_offset_div2           se(v)
        ph_cr_beta_offset_div2         se(v)
        ph_cr_tc_offset_div2           se(v)
}
``` ph_cb_beta_offset_div2 and ph_cb_tc_offset_div2 specify the deblocking parameter offsets for β and tC (divided by 2) that are applied to the Cb component for the slices in the current picture. The values of ph_cb_beta_offset_div2 and ph_cb_tc_offset_div2 shall both be in the range of −12 to 12, inclusive.

When not present, the values of ph_cb_beta_offset_div2 and ph_cb_tc_offset_div2 are inferred as follows:

If pps_chroma_tool_offsets_present_flag is equal to 1, the values of ph_cb_beta_offset_div2 and ph_cb_tc_offset_div2 are inferred to be equal to pps_cb_beta_offset_div2 and pps_cb_tc_offset_div2, respectively.

Otherwise (pps_chroma_tool_offsets_present_flag is equal to 0), the values of ph_cb_beta_offset_div2 and ph_cb_tc_offset_div2 are inferred to be equal to ph_luma_beta_offset_div2 and ph_luma_tc_offset_div2, respectively.

ph_cr_beta_offset_div2 and ph_cr_tc_offset_div2 specify the deblocking parameter offsets for β and tC (divided by 2) that are applied to the Cr component for the slices in the current picture. The values of ph_cr_beta_offset_div2 and ph_cr_tc_offset_div2 shall both be in the range of −12 to 12, inclusive.

When not present, the values of ph_cr_beta_offset_div2 and ph_cr_tc_offset_div2 are inferred as follows:

If pps_chroma_tool_offsets_present_flag is equal to 1, the values of ph_cr_beta_offset_div2 and ph_cr_tc_offset_div2 are inferred to be equal to pps_cr_beta_offset_div2 and pps_cr_tc_offset_div2, respectively.

Otherwise (pps_chroma_tool_offsets_present_flag is equal to 0), the values of ph_cr_beta_offset_div2 and ph_cr_tc_offset_div2 are inferred to be equal to ph_luma_beta_offset_div2 and ph_luma_tc_offset_div2, respectively.

ph_luma_beta_offset_div2 and ph_luma_tc_offset_div2 specify the deblocking parameter offsets for β and tC (divided by 2) that are applied to the luma component for the slices in the current picture. The values of ph_luma_beta_offset_div2 and ph_luma_tc_offset_div2 shall both be in the range of −12 to 12, inclusive. When not present, the values of ph_luma_beta_offset_div2 and ph_luma_tc_offset_div2 are inferred to be equal to pps_luma_beta_offset_div2 and pps_luma_tc_offset_div2, respectively.

In an example, at Slice header level, a deblocking control parameter for chroma component of the slice is represented according to sh_cb_beta_offset_div2, sh_cb_tc_offset_div2, sh_cr_beta_offset_div2 or sh_cr_tc_offset_div2.

It could be understood that, in some implementations, there is only one deblocking control parameter for chroma component or any combination of these deblocking control parameters.

For example, all these four deblocking control parameters are conditionally signaled according to the value of pps_chroma_tool_offsets_present_flag.

| if( pps_chroma_tool_offsets_present_flag ) { | |
|---|---|
| sh_cb_beta_offset_div2 | se(v) |
| sh_cb_tc_offset_div2 | se(v) |
| sh_cr_beta_offset_div2 | se(v) |
| sh_cr_tc_offset_div2 | se(v) |
| } | | sh_cb_beta_offset_div2 and sh_cb_tc_offset_div2 specify the deblocking parameter offsets for β and tC (divided by 2) that are applied to the Cb component for the current slice. The values of sh_cb_beta_offset_div2 and sh_cb_tc_offset_div2 shall both be in the range of −12 to 12, inclusive. When not present, the values of sh_cb_beta_offset_div2 and sh_cb_tc_offset_div2 are inferred as follows:

If pps_chroma_tool_offsets_present_flag is equal to 1, the values of sh_cb_beta_offset_div2 and sh_cb_tc_offset_div2 are inferred to be equal to ph_cb_beta_offset_div2 and ph_cb_tc_offset_div2, respectively.

Otherwise (pps_chroma_tool_offsets_present_flag is equal to 0), the values of sh_cb_beta_offset_div2 and sh_cb_tc_offset_div2 are inferred to be equal to sh_luma_beta_offset_div2 and sh_luma_tc_offset_div2, respectively.

sh_cr_beta_offset_div2 and sh_cr_tc_offset_div2 specify the deblocking parameter offsets for β and tC (divided by 2) that are applied to the Cr component for the current slice. The values of sh_cr_beta_offset_div2 and sh_cr_tc_offset_div2 shall both be in the range of −12 to 12, inclusive.

When not present, the values of sh_cr_beta_offset_div2 and sh_cr_tc_offset_div2 are inferred as follows:

If pps_chroma_tool_offsets_present_flag is equal to 1, the values of sh_cr_beta_offset_div2 and sh_cr_tc_offset_div2 are inferred to be equal to ph_cr_beta_offset_div2 and ph_cr_tc_offset_div2, respectively.

Otherwise (pps_chroma_tool_offsets_present_flag is equal to 0), the values of sh_cr_beta_offset_div2 and sh_cr_tc_offset_div2 are inferred to be equal to sh_luma_beta_offset_div2 and sh_luma_tc_offset_div2, respectively.

sh_luma_beta_offset_div2 and sh_luma_tc_offset_div2 specify the deblocking parameter offsets for β and tC (divided by 2) that are applied to the luma component for the current slice. The values of sh_luma_beta_offset_div2 and sh_luma_tc_offset_div2 shall both be in the range of −12 to 12, inclusive. When not present, the values of sh_luma_beta_offset_div2 and sh_luma_tc_offset_div2 are inferred to be equal to ph_luma_beta_offset_div2 and ph_luma_tc_offset_div2, respectively.

In an implementation, the method further comprises: setting the value of the deblocking control parameter for chroma component of the slice equal to a value of a deblocking control parameter for luma component of the slice, when the value of the syntax element is not equal to the preset value.

S804: performing deblocking process on a block in the slice according to the value of the deblocking control parameter.

Generally, for deblocking filter process, inputs to deblocking filter process are the reconstructed picture prior to deblocking, e.g. the array recPictureL and, when sps_chroma_format_idc is not equal to 0, the arrays recPictureCb and recPictureCr.

Outputs of this process are the modified reconstructed picture after deblocking, the array recPictureL and, when sps_chroma_format_idc is not equal to 0, the arrays recPictureCb and recPictureCr.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

The detail for deblcoking process could refer to the above description.

In an implementation as shown in FIG. 11, a video decoding apparatus 900 is disclosed, the apparatus 900 comprise:

a receiving module 901, which is configured to obtain a bitstream;

a parsing module 902 is configured to obtain a value of a syntax element from the bitstream, wherein the value of the syntax element is related to a deblocking control parameter for a chroma component of a slice of a coded picture, (e.g. the value of the syntax element indicates whether chroma tool offsets related syntax elements are present in a picture parameter set, PPS, raw byte sequence payload, RBSP, structure or not); the parsing module 902 is configured to obtain a value of a deblocking control parameter for chroma component of the slice from the bitstream, when the value of the syntax element is equal to a preset value, the preset value is an integer value.

The bitstream may be obtained according to wireless network or wired network. The bitstream may be transmitted from a website, server, or other remote source using a coaxial cable, fiber optic cable, twisted pair, digital subscriber line (DSL), or wireless technologies such as infrared, radio, microwave, WIFI, Bluetooth, LTE or 5G.

In an embodiment, a bitstream are a sequence of bits, in the form of a network abstraction layer (NAL) unit stream or a byte stream, that forms the representation of a sequence of access units (AUs) forming one or more coded video sequences (CVSs).

In some embodiments, for a decoding process, decoder side reads a bitstream and derives decoded pictures from the bitstream; for an encoding process, encoder side produces a bitstream.

Normally, a bitstream will comprise syntax elements that are formed by a syntax structure. syntax element: An element of data represented in the bitstream.

syntax structure: Zero or more syntax elements present together in the bitstream in a specified order.

In an embodiment, bitstream formats specifies the relationship between the network abstraction layer (NAL) unit stream and byte stream, either of which are referred to as the bitstream.

The bitstream can be in one of two formats: the NAL unit stream format or the byte stream format. The NAL unit stream format is conceptually the more "basic" type. The NAL unit stream format comprises a sequence of syntax structures called NAL units. This sequence is ordered in decoding order. There are constraints imposed on the decoding order (and contents) of the NAL units in the NAL unit stream.

The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes.

This clause specifies the relationship between source and decoded pictures that is given via the bitstream.

The video source that is represented by the bitstream is a sequence of pictures in decoding order.

The source and decoded pictures are each comprised of one or more sample arrays:

Luma (Y) only (monochrome).
Luma and two chroma (YCbCr or YCgCo).
Green, blue, and red (GBR, also known as RGB).
Arrays representing other unspecified monochrome or tri-stimulus colour samplings (for example, YZX, also known as XYZ).

The variables and terms associated with these arrays are referred to as luma (or L or Y) and chroma, where the two chroma arrays are referred to as Cb and Cr; regardless of the actual colour representation method in use. The actual colour representation method in use can be indicated in syntax that is specified in VUI parameters as specified in ITU-T H.SEI|ISO/IEC 23002-7.

The further details for receiving module 901 and parsing module 902 could refer to the above method examples and implementations.

Example 1. A method of coding implemented by a decoding device, the method comprising:

obtaining a bitstream for a coding block;
obtaining a value of a syntax from the bitstream;
obtaining a value of deblocking control parameter from the bitstream, when the value of the syntax is equal to a preset value (in an example, the preset value is not equal to 0).

Example 2. The method of example 1, wherein the value of the syntax is obtained at a sequence parameter set level.

Example 3. The method of example 1, wherein the value of the syntax is obtained according to a picture parameter set.

Example 4. The method of example 1, wherein the value of the syntax is obtained according to a picture header.

Example 5. The method of example 1, wherein the value of the syntax is obtained according to a slice header.

Example 6. The method of any one of examples 1 to 5, wherein the value of the deblocking control parameter is obtained according to a picture parameter set.

Example 7. The method of any one of examples 1 to 5, wherein the value of the deblocking control parameter is obtained according to a picture header.

Example 8. The method of any one of examples 1 to 5, wherein the value of the deblocking control parameter is obtained according to a slice header.

Example 9. The method of any one of examples 1 to 5, wherein the value of the deblocking control parameter is obtained at a sequence parameter set level.

Example 10. The method of any one of examples 1 to 9, wherein a value of the syntax is used to indicate there is no color component in a video sequence.

Example 11. The method of any one of examples 1 to 10, wherein the deblocking control parameter is signaled only when the video sequence has a color component.

Example 12. The method of any one of examples 1 to 9, wherein a value of the syntax is used to whether deblocking control parameter for luma component of the block is same as deblocking control parameter for chroma component of the block or not.

Example 13. The method of any one of examples 1 to 12, wherein the value of the deblocking control parameter is a preset deblocking parameter offsets that is applied to a Joint Cb-Cr component of the block.

Example 14. A decoder (30) comprising processing circuitry for carrying out the method according to any one of examples 1 to 13.

Example 15. A computer program product comprising program code for performing the method according to any one of the preceding examples when executed on a computer or a processor.

Example 16. A decoder, comprising:
one or more processors; and
a non-transitory computer-readable storage medium coupled to the processors and storing programming for execution by the processors, wherein the programming, when executed by the processors, configures the decoder to carry out the method according to any one of the preceding examples.

Example 17. A non-transitory computer-readable medium carrying a program code which, when executed by a computer device, causes the computer device to perform the method of any one of the preceding examples.

Following is an explanation of the applications of the encoding method as well as the decoding method as shown in the above-mentioned embodiments, and a system using them.

FIG. 6 is a block diagram showing a content supply system 3100 for realizing content distribution service. This content supply system 3100 includes capture device 3102, terminal device 3106, and may include display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 7:
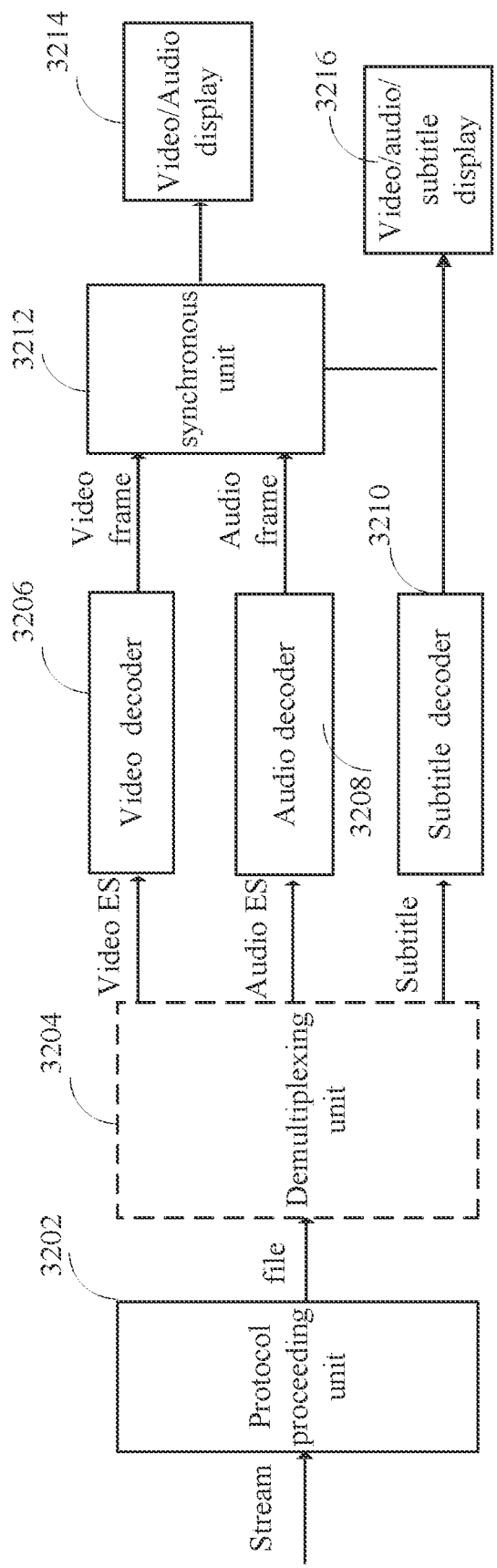
FIG. 7 is a block diagram showing a structure of an example of a terminal device.

FIG. 7 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and subtitle (which may be optional in some embodiments) are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 7) before feeding it to the synchronous unit 3212. Similarly, the audio frame may store in a buffer (not shown in FIG. 7) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators

The following logical operators are defined as follows:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Relational Operators

The following relational operators are defined as follows:

| | |
|---|---|
| > | Greater than |
| >= | Greater than or equal to |
| < | Less than |
| <= | Less than or equal to |
| == | Equal to |
| != | Not equal to |

When a relational operator is applied to a syntax element or variable that has been assigned the value "no" (not applicable), the value "na" is treated as a distinct value for the syntax element or variable. The value "na" is considered not to be equal to any other value.

Bit-Wise Operators

The following bit-wise operators are defined as follows:

| | |
|---|---|
| & | Bit-wise "and". When operating on integer arguments, operates on a two's complement representation of the integer value. When operating on a binary argument that contains fewer bits than another argument, the shorter argument is extended by adding more significant bits equal to 0. |
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

Assignment Operators

The following arithmetic operators are defined as follows:

| | |
|---|---|
| = | Assignment operator |
| + + | Increment, i.e., x+ + is equivalent to x = x + 1; when used in an array index, evaluates to the value of the variable prior to the increment operation. |
| − − | Decrement, i.e., x— is equivalent to x = x − 1; when used in an array index, evaluates to the value of the variable prior to the decrement operation. |
| += | Increment by amount specified, i.e., x += 3 is equivalent to x = x + 3, and x += (−3) is equivalent to x = x + (−3). |
| −= | Decrement by amount specified, i.e., x −= 3 is equivalent to x = x − 3, and x −= (−3) is equivalent to x = x − (−3). |

Range Notation

The following notation is used to specify a range of values:

| | |
|---|---|
| x = y . . . z | x takes on integer values starting from y to z, inclusive, with x, y, and z being integer numbers and z being greater than y. |

Mathematical Functions
The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$A\tan2(y, x) = \begin{cases} A\tan\left(\frac{y}{x}\right); & x > 0 \\ A\tan\left(\frac{y}{x}\right) + \pi; & x < 0 \,\&\&\, y >= 0 \\ A\tan\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

$\text{Clip1}_Y(x) = \text{Clip3}(0, (1 << \text{BitDepth}_Y) - 1, x)$ $\text{Clip1}_C(x) = \text{Clip3}(0, (1 << \text{BitDepth}_C) - 1, x)$ $$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x) = Sign(x)*Floor(Abs(x)+0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians $\text{Sqrt}(x) = \sqrt{x}$ Swap(x,y) = (y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

Table: Operation precedence from highest (at top of table) to lowest (at bottom of table)

| operations (with operands x, y, and z) |
| --- |
| "x++", "x− −" |
| "!x", "−x" (as a unary prefix operator) |
| $x^y$ |
| $"x*y", "x/y", "x \div y", "\frac{x}{y}", "x \% y"$ |
| $"x + y", "x - y"$ (as a two-argument operator)," $\sum_{i=x}^{y} f(i)$" |
| "x << y", "x >> y" |
| "x < y"; "x <= y", "x > y", "x >= y" |
| "x = = y", "x! = y" |
| "x & y" |
| "x \| y" |
| "x && y" |
| "x \|\| y" |
| "x ? y : z" |
| "x..y" |
| "x = y"; "x += y", "x −= y" |

Text Description of Logical Operations
In the text, a statement of logical operations as would be described mathematically in the following form:

```
if( condition 0)
    statement 0
else if( condition 1 )
    statement 1
...
else /* informative remark on remaining condition */
    statement n
``` may be described in the following manner:

... as follows / ... the following applies:
- If condition 0, statement 0
- Otherwise, if condition 1, statement 1
- ...
- Otherwise (informative remark on remaining condition), statement n Each "If ... Otherwise, if ... Otherwise, ..." statement in the text is introduced with " ... as follows" or " ... the following applies" immediately followed by "If ... ". The last condition of the "If ... Otherwise, if ... Otherwise, ..." is always an "Otherwise, ...". Interleaved "If ... Otherwise, if ... Otherwise, ..." statements can be identified by matching " ... as follows" or " ... the following applies" with the ending "Otherwise, ...".

In the text, a statement of logical operations as would be described mathematically in the following form:

```
if( condition 0a  &&  condition 0b )
    statement 0
else if( condition 1a  | |  condition 1b )
    statement 1
...
else
    statement n
``` may be described in the following manner:

```
... as follows / ... the following applies:
-  If all of the following conditions are true, statement 0:
   -  condition 0a
   -  condition 0b
-  Otherwise, if one or more of the following conditions are true,
   statement 1:
   -  condition 1a
   -  condition 1b
-  ...
-  Otherwise, statement n
```

In the text, a statement of logical operations as would be described mathematically in the following form:

```
if( condition 0 )
    statement 0
if( condition 1 )
    statement 1
``` may be described in the following manner:
When condition 0, statement 0
When condition 1, statement 1.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method of coding, comprising:
   obtaining a value of a syntax element from a bitstream, wherein the value of the syntax element indicates signaling of a deblocking control parameter for a chroma component of a slice of a coded picture, wherein the deblocking control parameter includes a deblocking parameter offset for a Cr component and a deblocking parameter offset for a Cb component, wherein the deblocking parameter offset for the Cr component is a separate parameter from the deblocking parameter offset for the Cb component, wherein when there is no color component in a video sequence, the value of the syntax element is 0, wherein the value of the syntax element is used to determine whether a deblocking control parameter for a luma component of the slice is same as the deblocking control parameter for the chroma component of the slice;
   parsing a value of the deblocking control parameter for the chroma component of the slice from the bitstream, when the value of the syntax element is equal to a preset value that is an integer value; and
   performing a deblocking process on a block in the slice according to the value of the deblocking control parameter.

2. The method of claim 1, wherein the value of the syntax element is obtained from a picture parameter set (PPS).

3. The method of claim 2, wherein the value of the deblocking control parameter for the chroma component of the slice is obtained from the PPS.

4. The method of claim 1, wherein the value of the deblocking control parameter for the chroma component of the slice is obtained from a picture header (PH).

5. The method of claim 1, wherein the value of the deblocking control parameter for the chroma component of the slice is obtained from a slice header (SH).

6. The method of claim 1, wherein the deblocking control parameter for the chroma component of the slice is signaled when a video sequence has a color component.

7. The method of claim 1, wherein the method further comprises:
   setting the value of the deblocking control parameter for the chroma component of the slice to a value of a deblocking control parameter for a luma component of the slice, when the value of the syntax element is not equal to the preset value.

8. The method of claim 1, wherein the value of the deblocking control parameter is a preset deblocking parameter offsets applied to a Joint Cb-Cr component of the slice.

9. A decoder comprising processing circuitry to perform operations, the operations comprising:
   obtaining a value of a syntax element from a bitstream, wherein the value of the syntax element indicates signaling of a deblocking control parameter for a chroma component of a slice of a coded picture, wherein the deblocking control parameter includes a deblocking parameter offset for a Cr component and a deblocking parameter offset for a Cb component, wherein the deblocking parameter offset for the Cr component is a separate parameter from the deblocking parameter offset for the Cb component, wherein when there is no color component in a video sequence, the value of the syntax element is 0, wherein the value of the syntax element is used to determine whether a deblocking control parameter for a luma component of the slice is same as the deblocking control parameter for the chroma component of the slice;
   parsing a value of the deblocking control parameter for the chroma component of the slice from the bitstream, when the value of the syntax element is equal to a preset value that is an integer value; and
   performing a deblocking process on a block in the slice according to the value of the deblocking control parameter.

10. The decoder of claim 9, wherein the value of the syntax element is obtained from a picture parameter set (PPS).

11. The decoder of claim 10, wherein the value of the deblocking control parameter for the chroma component of the slice is obtained from the PPS.

12. The decoder of claim 9, wherein the value of the deblocking control parameter for the chroma component of the slice is obtained from a picture header (PH).

13. A decoder, comprising:
   one or more processors; and
   a non-transitory computer-readable storage medium coupled to the one or more processors and comprising a bitstream decoded by performing operations, the operations comprising:
   obtaining a value of a syntax element from a bitstream, wherein the value of the syntax element indicates signaling of a deblocking control parameter for a chroma component of a slice of a coded picture, wherein the deblocking control parameter includes a deblocking parameter offset for a Cr component and a deblocking parameter offset for a Cb component, wherein the deblocking parameter offset for the Cr component is a separate parameter from the deblocking parameter offset for the Cb component, wherein when there is no color component in a video sequence, the value of the syntax element is 0, wherein the value of the syntax element is used to determine whether a deblocking control parameter for a luma component of the slice is same as the deblocking control parameter for the chroma component of the slice;
   parsing a value of the deblocking control parameter for the chroma component of the slice from the bitstream, when the value of the syntax element is equal to a preset value that is an integer value; and
   performing a deblocking process on a block in the slice according to the value of the deblocking control parameter.

14. The decoder of claim 13, wherein the value of the syntax element is obtained from a picture parameter set (PPS).

15. The decoder of claim 14, wherein the value of the deblocking control parameter for the chroma component of the slice is obtained from the PPS.

16. The decoder of claim 13, wherein the value of the deblocking control parameter for the chroma component of the slice is obtained from a picture header (PH).

17. A non-transitory computer readable medium storing a bitstream that, when decoded by a coding device, is used by the coding device to generate a video, the bitstream comprising:
   a syntax element, wherein a value of the syntax element indicates signaling of a deblocking control parameter for a chroma component of a slice of a coded picture, wherein the deblocking control parameter includes a deblocking parameter offset for a Cr component and a deblocking parameter offset for a Cb component, wherein the deblocking parameter offset for the Cr component is a separate parameter from the deblocking parameter offset for the Cb component, wherein when there is no color component in a video sequence, the value of the syntax element is 0, wherein the value of the syntax element is used to determine whether a deblocking control parameter for a luma component of the slice is same as the deblocking control parameter for the chroma component of the slice; and a value of the deblocking control parameter for the chroma component of the slice when the value of the syntax element is equal to a preset value that is an integer value;

wherein the value of the deblocking control parameter is used to perform a deblocking process on a block in the slice.

\* \* \* \* \*